(12) United States Patent
Hosoki

(10) Patent No.: US 7,953,959 B2
(45) Date of Patent: May 31, 2011

(54) PROCESSOR

(75) Inventor: Tetsu Hosoki, Osaka (JP)

(73) Assignee: Panasonic Corporation, Osaka (JP)

( * ) Notice: Subject to any disclaimer, the term of this patent is extended or adjusted under 35 U.S.C. 154(b) by 752 days.

(21) Appl. No.: 11/916,474

(22) PCT Filed: Mar. 9, 2006

(86) PCT No.: PCT/JP2006/304550
§ 371 (c)(1), (2), (4) Date: Dec. 4, 2007

(87) PCT Pub. No.: WO2006/134693
PCT Pub. Date: Dec. 21, 2006

(65) Prior Publication Data
US 2009/0228687 A1    Sep. 10, 2009

(30) Foreign Application Priority Data

Jun. 15, 2005 (JP) .................. 2005-174860

(51) Int. Cl.
*G06F 9/38* (2006.01)
(52) U.S. Cl. .................................. 712/215
(58) Field of Classification Search .............. None
See application file for complete search history.

(56) References Cited

U.S. PATENT DOCUMENTS

| | | | | |
|---|---|---|---|---|
| 5,822,560 A * | 10/1998 | Pflum | ............... | 712/214 |
| 5,890,009 A * | 3/1999 | Luick et al. | ............ | 712/24 |
| 5,894,582 A * | 4/1999 | Yoshida et al. | | |
| 6,035,389 A * | 3/2000 | Grochowski et al. | ........ | 712/216 |
| 6,338,133 B1 * | 1/2002 | Schroter | ............ | 712/214 |
| 6,618,802 B1 * | 9/2003 | Arnold et al. | | |
| 6,651,164 B1 * | 11/2003 | Soltis, Jr. et al. | | |
| 7,237,094 B2 * | 6/2007 | Curran et al. | ............ | 712/213 |
| 7,254,697 B2 * | 8/2007 | Bishop et al. | ............ | 712/213 |
| 7,266,674 B2 * | 9/2007 | Carrie | ............ | 712/219 |
| 2004/0193929 A1 * | 9/2004 | Kuranuki | | |
| 2004/0216104 A1 * | 10/2004 | Fluhr et al. | ............ | 718/100 |
| 2007/0255928 A1 * | 11/2007 | Fukai | | |
| 2008/0010373 A1 * | 1/2008 | Tojo | | |

FOREIGN PATENT DOCUMENTS

| | | | |
|---|---|---|---|
| JP | 5199427 | * | 9/1976 |
| JP | 3-259340 | | 11/1991 |
| JP | 3259340 | * | 11/1991 |
| JP | 4-308930 | | 10/1992 |

(Continued)

OTHER PUBLICATIONS

English language Abstract of JP 3-259340.*

(Continued)

*Primary Examiner* — Eric Coleman
(74) *Attorney, Agent, or Firm* — Greenblum & Bernstein, P.L.C.

(57) ABSTRACT

A processor includes: an instruction buffer which holds a group of instructions that can be executed in parallel; an instruction decoding unit which decodes part or all of the group of instructions; and an instruction issuance control unit which detects whether or not a factor obstructing simultaneous execution of the group of instructions exists in the group of instructions and supplies the group of instructions to the instruction decoding unit by controlling the instruction buffer so that the instructions of the group of instructions are sequentially supplied when the factor exists and all the instructions of the group of instructions are simultaneously supplied when the factor does not exist.

13 Claims, 23 Drawing Sheets

FOREIGN PATENT DOCUMENTS

| | | | |
|---|---|---|---|
| JP | 6-332701 | | 12/1994 |
| JP | 6332701 | * | 12/1994 |
| JP | 8221273 | * | 8/1996 |
| JP | 8305567 | * | 11/1996 |
| JP | 8-328859 | | 12/1996 |
| JP | 10-049348 | | 2/1998 |
| JP | 200192656 | * | 4/2001 |
| JP | 2001-134442 | | 5/2001 |
| JP | 2001134442 | * | 5/2001 |

OTHER PUBLICATIONS

English language Abstract of JP 6-332701.*

English language Abstract of JP 2001-134442.*

English language Abstract of JP 8-305567.*

English language Abstract of JP 2001-92656.*

English language Abstract of JP 8-221273.*

U.S. Appl. No. 11/850,761 to Hosoki et al., which was filed on Sep. 6, 2007.*

English language translation of Paragraphs [0023]-[0032] and Figures 1-5, 7 of JP 6-332701, Dec. 2, 1994.

English language translation of Paragraph [008] of JP 8-328859, Dec. 13, 1996.

* cited by examiner

FIG. 4A
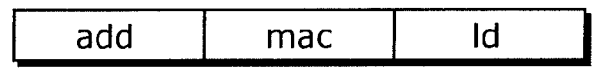
FIG. 4B
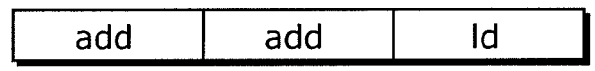
FIG. 5A
| | add(Valid) | mac(Valid) | ld(Valid) | |
|---|---|---|---|---|
| First cycle | add(Valid) | mac(Valid) | ld(Valid) | Update permitted |
FIG. 5B
| | | | | |
|---|---|---|---|---|
| First cycle | add(Valid) | Invalid | Invalid | Update suspended |
| Second cycle | Invalid | add(Valid) | Invalid | Update suspended |
| Third cycle | Invalid | Invalid | ld(Valid) | Update permitted |

FIG. 8A

| rnd | add | ld |
|---|---|---|

FIG. 8B

| rnd | ld | - (Invalid) |
|---|---|---|

FIG. 9A

| | | | | |
|---|---|---|---|---|
| First cycle | rnd(Valid) | Invalid | Invalid | Update suspended |
| Second cycle | Invalid | add(Valid) | Invalid | Update suspended |
| Third cycle | Invalid | Invalid | ld(Valid) | Update permitted |

FIG. 9B

| | | | | |
|---|---|---|---|---|
| First cycle | rnd(Valid) | Invalid | Invalid | Update suspended |
| Second cycle | Invalid | ld(Valid) | Invalid | Update suspended |
| Third cycle | Invalid | Invalid | - (Invalid) | Update permitted |

FIG. 12A

| add | add | ld |
|---|---|---|

FIG. 12B

| add | add | – (Invalid) |
|---|---|---|

FIG. 13A

| | | | | |
|---|---|---|---|---|
| First cycle | add(Valid) | Invalid | Invalid | Update suspended |
| Second cycle | Invalid | add(Valid) | Invalid | Update suspended |
| Third cycle | Invalid | Invalid | ld(Valid) | Update permitted |

FIG. 13B

| | | | | |
|---|---|---|---|---|
| First cycle | add(Valid) | Invalid | Invalid | Update suspended |
| Second cycle | Invalid | add(Valid) | Invalid | Update permitted |

FIG. 17A

| | | | | Instruction buffer | Invalidation control counter |
|---|---|---|---|---|---|
| First cycle | Invalid | div Start(Valid) | Invalid | Update suspended | Update suspended |
| | | ... | | ... | ... |
| n−1 cycle | Invalid | div(Valid) | Invalid | Update suspended | Update suspended |
| n cycle | add(Valid) | div End(Valid) | ld(Valid) | Update permitted | Update permitted |

FIG. 17B

| | | | | Instruction buffer | Invalidation control counter |
|---|---|---|---|---|---|
| First cycle | add(Valid) | Invalid | Invalid | Update suspended | Update permitted(0→1) |
| Second cycle | Invalid | div Start(Valid) | Invalid | Update suspended | Update suspended |
| | | ... | | ... | ... |
| n+1 cycle | Invalid | div End(Valid) | Invalid | Update suspended | Update permitted(1→2) |
| n+2 cycle | Invalid | Invalid | div Start(Valid) | Update suspended | Update suspended |
| | | ... | | ... | ... |
| 2n+1 cycle | Invalid | Invalid | div End(Valid) | Update permitted | Update permitted(2→0) |

FIG. 21A

| add | mac | ld |
|-----|-----|-----|

FIG. 21B

|  | Instruction buffer | Invalidation control counter |
|---|---|---|
| First cycle | add(Valid) | Invalid | Update suspended | Update permitted(0→1) |
| Second cycle | Invalid | div Start(Valid) | Update suspended | Update suspended |
| ... | ... | ... | ... | ... |
| n+1 cycle | Invalid | div End(Valid) | Invalid | Update suspended | Update permitted(1→2) |
| n+2 cycle | Invalid | Invalid | div Start(Valid) | Update suspended | Update suspended |
| ... | ... | ... | ... | ... |
| 2n+1 cycle | Invalid | Invalid | div End(Valid) | Update permitted | Update permitted(2→0) |

FIG. 21C

|  | Instruction buffer | Invalidation control counter |
|---|---|---|
| First cycle | add(Valid) | Invalid | Update suspended | Update permitted(0→1) |
| Second cycle | Invalid | div Start(Valid) | Update suspended | Update suspended |
| ... | ... | ... | ... | ... |
| n+1 cycle | Invalid | div End(Valid) | Invalid | Update suspended | Update permitted(1→2) |
| n+2 cycle | Invalid | Invalid | ld(Valid) | Update permitted | Update permitted(2→0) |

FIG. 24

| Input | | | Output | | |
|---|---|---|---|---|---|
| 472-1 | 472-2 | 472-3 | 468-1 | 468-2 | 468-3 |
| 0 | 0 | 0 | 674-1 | 674-1 | 674-1 |
| 0 | 0 | 1 | 674-1 | 674-1 | 674-1 |
| 0 | 1 | 0 | 674-1 | 674-1 | 674-1 |
| 0 | 1 | 1 | 674-1 | 674-1 | 674-2 |
| 1 | 0 | 0 | 674-1 | 674-1 | 674-1 |
| 1 | 0 | 1 | 674-1 | 674-1 | 674-2 |
| 1 | 1 | 0 | 674-1 | 674-2 | 674-2 |
| 1 | 1 | 1 | 674-1 | 674-2 | 674-3 |

FIG. 26A

| add | mac | ld |
|---|---|---|

FIG. 26B

| | | | | | Instruction buffer | Invalidation control counter |
|---|---|---|---|---|---|---|
| First cycle | Invalid | div Start(Valid) | ... | Invalid | Update suspended | Update suspended |
| n cycle | add(Valid) | div End(Valid) | ... | Invalid | ... | ... |
| n+1 cycle | Invalid | Invalid | ... | div Start(Valid) | Update suspended | Update permitted(0→1) |
| 2n cycle | Invalid | Invalid | ... | div End(Valid) | Update permitted | Update permitted(1→0) |

PROCESSOR

TECHNICAL FIELD

The present invention relates to a processor which decodes plural instructions and executes the decoded plural instructions in parallel.

BACKGROUND ART

In recent years, techniques concerning a control method for plural instructions that cannot be executed simultaneously have been variously proposed for a processor which decodes the plural instructions and executes the decoded plural instructions in parallel.

As an example, a control mechanism in which instructions are sent to an execution stage, it is judged whether or not unusable data is depended during processing of the instructions at the execution stage, and only such instruction is suspended and other instructions are executed simultaneously in the case where it is judged to be depended on an instruction is provided. That is, a technique in which the processing is suspended by generating a hazard in the case where the instructions cannot be executed simultaneously after reaching the execution stage is proposed (for example, see Patent Reference 1).

Furthermore, it is judged whether the instructions can be executed simultaneously based on the number of unissued instructions in an instruction buffer and instruction registers corresponding to functional units, and an update control of registers is performed. In other words, a technique in which a circuit for monitoring an execution state is provided to a processor and the processing is suspended by controlling instruction supply before moving to the execution stage on the basis of information about what kind of the execution state an instruction preexisting in the functional unit is in is proposed (for example, see Patent Reference 2).

Patent Reference 1: Japanese Patent Application Laid-Open Publication No. 8-221273

Patent Reference 2: Japanese Patent Application Laid-Open Publication No. 8-305567

DISCLOSURE OF INVENTION

Problems that Invention is to Solve

However, under the conventional technology, there is a problem that a control mechanism for judging data dependency of instructions during an execution stage cannot be applied to plural instructions which generate structural hazards when reducing the number of functional units along with circuit area saving. This is because a possibility of executing instructions simultaneously is judged after sending the instructions to the execution stage.

Moreover, it is possible to execute plural multi-cycle instructions simultaneously if the number of counters provided is the same as that of instructions which can be executed simultaneously, the multi-cycle instructions executing plural operations with respect to one instruction code. Nonetheless, if the number of the counters is reduced along with circuit area saving, the same problem as above occurs.

In a method for judging whether or not the simultaneous execution is possible based on a conventional buffer and the number of unissued instructions in instruction registers, it is necessary to detect a status of the execution of instructions with the functional units, and additionally there is a problem that the method cannot be applied to a processor having instruction buffers which already hold the plural instructions in parallel.

That is, in the case where an architecture is altered, such as a case where the number of the functional units is reduced along with circuit area saving or a case where single-cycle instructions are changed into multi-cycle instructions, there is a problem that the method cannot be applied.

The present invention is developed in view of the above-mentioned problem. An object of the present invention is to provide a processor which can be used without modifying object codes optimized to the architecture before alteration, even in the case where the architecture of the processor is altered, such as a case where the number of the functional units is reduced along with circuit area saving or a case where the single-cycle instructions are changed into the multi-cycle instructions.

Means to Solve the Problems

In order to solve the above problem, a processor according to the present invention is (a) a processor which decodes plural instructions and executes the decoded plural instructions in parallel, and includes: (b) an instruction buffer which holds a group of instructions that can be executed in parallel; (c) an instruction decoding unit which decodes part or all of the group of instructions; and (d) an instruction issuance control unit which detects whether or not a factor obstructing simultaneous execution of the group of instructions exists in the group of instructions and supplies the group of instructions to the instruction decoding unit by controlling the instruction buffer so that the instructions of the group of instructions are sequentially supplied when the factor exists and all the instructions of the group of instructions are simultaneously supplied when the factor does not exist.

Consequently, even in the case where an instruction program optimized for other processor which includes an instruction execution unit having partly different configuration exists, combinations of instructions that can be executed simultaneously differ, and plural instructions which cannot be executed are held in instruction buffers, it becomes possible to use the program without modifying the program or changing a storing method of the instruction buffer by sequentially supplying instructions by the instruction issuance control unit.

Furthermore, it becomes possible to judge whether or not simultaneous execution is possible only by static information of the instruction without detecting an operation status of an instruction execution unit or the like, which contributes to facilitation of design and shortening of a design period.

Further, the instruction issuance control unit may detect, as a factor, a combination of instructions that generates a structural hazard is included in a group of instructions, based on a result of decoding of the group of instructions, the result being inputted from the instruction decoding unit.

Alternatively, the instruction issuance control unit may detect, as a factor, one or more instructions that can generate a structural hazard are included in the group of instructions, based on a result of decoding of the group of instructions, the result being inputted from the instruction decoding unit.

As a result, detection of the structural hazard is simplified and can be performed at higher speed, which contributes to acceleration of the processor's operation speed.

Alternatively, the instruction issuance control unit may detect, as a factor, the predetermined number of the multi-cycle instructions is included in the group of instructions, based on a result of pre-decoding of the group of instructions, the result being inputted from the instruction buffer.

Alternatively, the instruction issuance control unit may detect, as a factor, one or more multi-cycle instructions are included in the group of instructions, based on a result of pre-decoding of the group of instructions, the result being inputted from the instruction buffer.

Accordingly, detection of the multi-cycle instructions is simplified and can be performed at higher speed, which contributes to acceleration of the processor's operation speed.

Alternatively, in the case where the instructions of the group of instructions are sequentially supplied, the instruction issuance control unit may sequentially supply, one-at-a-time, from the group of instructions, instructions corresponding to respective values of a counter, using the counter which has, as the largest value, the largest number of the instructions that can be decoded simultaneously by the instruction decoding unit.

Consequently, it becomes possible to control supply of the instructions by using the counter's counter value determined only by instructions of the instruction buffer without detecting the operation status of the instruction execution unit or the like, which contributes to facilitation of design and shortening of a design period.

Alternatively, in the case where the instructions of the group of instructions are sequentially supplied, the instruction issuance control unit may sequentially supply, one-at-a-time, from the group of instructions, instructions corresponding to respective values of a counter, using the counter which has, as the largest value, the number of the instructions held by the instruction buffer.

As a result, even in the case where the largest number of the instructions that can be decoded simultaneously by the instruction decoding unit are not placed in the instruction buffer, it becomes possible to control supply of the instructions without a redundant machine cycle, which contributes to improvement of processing performance.

Alternatively, in the case where the instructions of the group of instructions are sequentially supplied, the instruction issuance control unit may divide the group of instructions into sub-groups of instructions each of which has one or less instruction that can generate the structural hazard, and sequentially supply the sub-groups of instructions corresponding to respective values of a counter, using the counter which has, as the largest value, the number of the instructions that can generate the structural hazard.

Accordingly, it becomes possible to always simultaneously supply the largest number of the instructions that can be executed simultaneously, which contributes to improvement of processing performance.

Alternatively, in the case where the instructions of the group of instructions are sequentially supplied, the instruction issuance control unit may divide the group of instructions into sub-groups of instructions each of which has one or less multi-cycle instruction, and sequentially supply the sub-groups of instructions corresponding to respective values of a counter, using the counter which has, as the largest value, the number of the multi-cycle instructions.

Consequently, it becomes possible to always simultaneously supply the largest number of the instructions that can be executed simultaneously, which contributes to improvement of processing performance.

It should be noted that the present invention may be realized not only as a processor but also as a method for controlling the processor and the like.

Moreover, it may be realized as a LSI in which functions provided by the processor are embedded, as an IP core which forms the functions on a programmable logic device such as FPGA, CPLD, and the like, and as a recording media in which the IP core is stored.

DISCLOSURE OF INVENTION

As described above, with a processor according to the present invention, even in the case where an instruction program optimized for other processor which includes an instruction execution unit having partly different configuration exists, combinations of instructions that can be executed simultaneously differ, and plural instructions which cannot be executed are held in instruction buffers, it becomes possible to use the program without modifying the program or changing a storing method of the instruction buffer by sequentially supplying instructions by an instruction issuance control unit.

It becomes possible to judge whether or not simultaneous execution is possible only by static information of the instruction without detecting an operation status of the instruction execution unit or the like, which contributes to facilitation of design and shortening of a design period.

In the case where a program becomes inexecutable with other processor since single-cycle instructions that can be simultaneously executed in plural number are modified into a multi-cycle instruction, in the case where the program is optimized for another processor and includes the single-cycle instruction, and in the case where multiple multi-cycle instructions that cannot be executed simultaneously exist in the instruction buffer, the program can be executed as is by sequentially supplying the instructions by the instruction issuance control unit without modifying the program or changing the storing method of the instruction buffer.

BRIEF DESCRIPTION OF DRAWINGS

FIG. 4A is a view showing an example program for describing the first embodiment.

FIG. 4B is a view showing an example program for describing the first embodiment.

FIG. 5A is a graphical illustration of an operation for describing the first embodiment.

FIG. 5B is a graphical illustration of an operation for describing the first embodiment.

FIG. 8A is a view showing an example program for describing the second embodiment.

FIG. 8B is a view showing an example program for describing the second embodiment.

FIG. 9A is a graphical illustration of an operation for describing the second embodiment.

FIG. 9B is a graphical illustration of an operation for describing the second embodiment.

FIG. 12A is a view showing an example program for describing the third embodiment.

FIG. 12B is a view showing an example program for describing the third embodiment.

FIG. 13A is a graphical illustration of an operation for describing the third embodiment.

FIG. 13B is a graphical illustration of an operation for describing the third embodiment.

FIG. 17A is a graphical illustration of an operation for describing the fourth embodiment.

FIG. 17B is a graphical illustration of an operation for describing the fourth embodiment.

FIG. 21A is a graphical illustration of an operation for describing the fifth embodiment.

FIG. 21B is a graphical illustration of an operation for describing the fifth embodiment.

FIG. 21C is a graphical illustration of an operation for describing the fifth embodiment.

FIG. 24 is a view showing a truth table for an input-output relation of an invalidation instruction selection unit according to the sixth embodiment.

FIG. 26A is a graphical illustration of an operation for describing the sixth embodiment.

FIG. 26B is a graphical illustration of an operation for describing the sixth embodiment.

NUMERICAL REFERENCES

Figure 1:
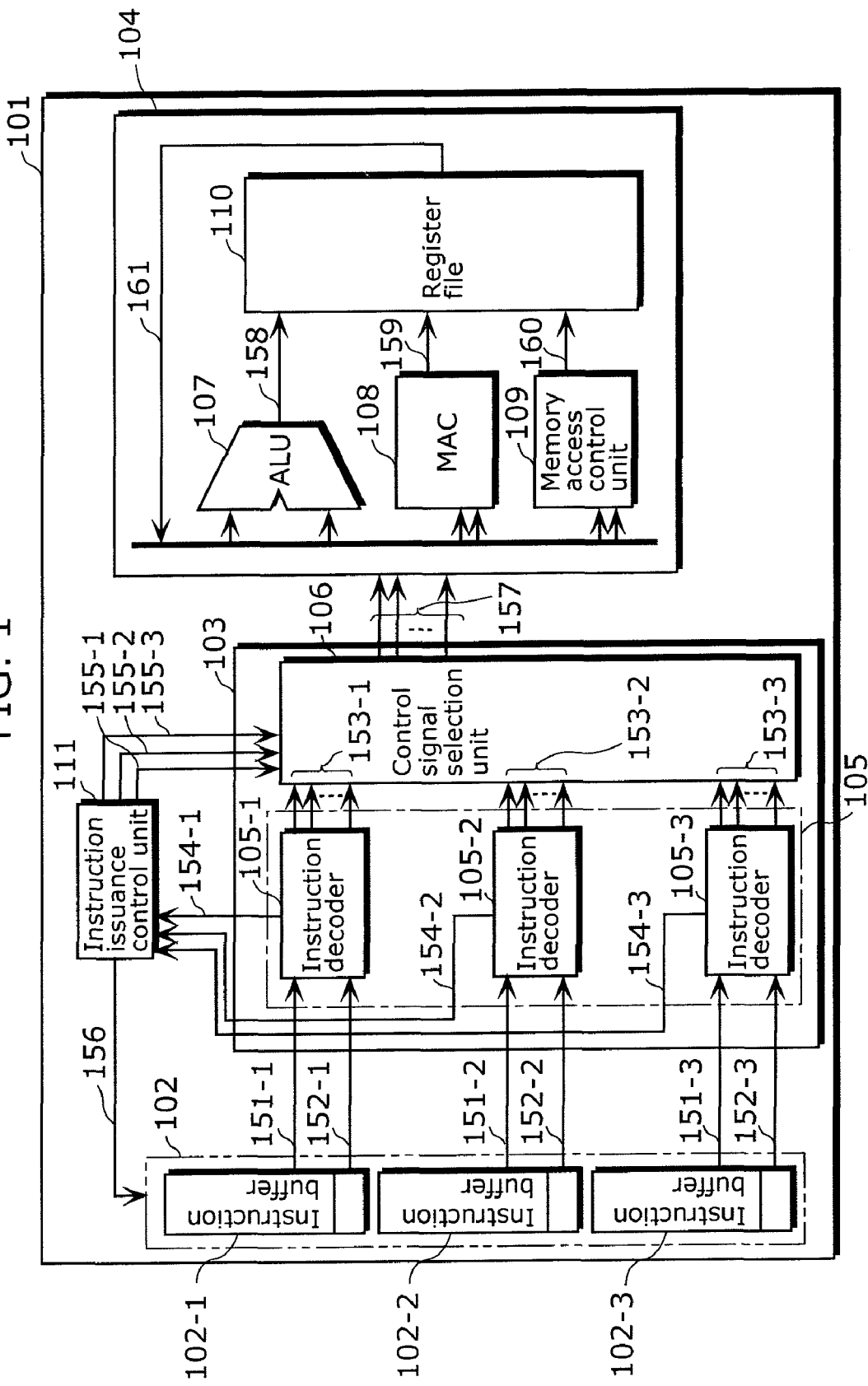
FIG. 1 is a block diagram showing a configuration of a processor according to a first embodiment.

101, 201, 301, 401, 501, 601 Processor
102, 402 Instruction buffer
103, 403 Instruction decoding unit
104, 404 Instruction execution unit
105, 405 Instruction decoder
106, 406 Control signal selection unit
107, 407 Arithmetic and logic unit
108, 408 Multiply and accumulation unit
109, 409 Memory access control unit
110, 410 Register file
111, 211, 311, 411, 511, 611 Instruction issuance control unit
112, 212 Structural hazard detection unit
113, 313, 414, 614 Instruction invalidation control unit
412 Multi-cycle instruction decoding management unit
413, 513, 613 Multi-cycle instruction detection unit
420 Division unit
624 Invalidation instruction selection unit

BEST MODE FOR CARRYING OUT THE INVENTION

First Embodiment

Hereinafter, a first embodiment according to the present invention is described with reference to the drawings.

A processor according to the first embodiment is a processor which decodes plural instructions and execute the decoded plural instructions in parallel. The processor is characterized in that holding a group of instructions that can be executed in parallel, the processor can decode part or all of the group of instructions, and that the processor supplies the group of instructions to an instruction decoding unit by controlling an instruction buffer so that the instructions of the group of instructions are sequentially supplied when the factor exists and all the instructions of the group of instructions are simultaneously supplied when the factor does not exist.

Furthermore, the processor according to the first embodiment is characterized by detecting, as a factor, that a combination of instructions which generates a structural hazard is included in the group of instructions, based on a result of decoding of the group of instructions, the result being inputted from the instruction decoding unit.

Moreover, when sequentially supplying the instructions of the group of instructions, the processor according to the first embodiment is characterized by sequentially supplying, one at a time, instructions corresponding to respective values of a counter from the group of instructions using the counter which has, as the largest value, the largest number of instructions that can be decoded simultaneously by the instruction decoding unit.

On the basis of the above points, the processor according to the first embodiment is described.

FIG. 1 is a block diagram showing a configuration of the processor according to the first embodiment. Here, although the configuration of the processor which can simultaneously execute three instructions is shown, a scope of application of the present invention is not limited to the three instructions.

As shown by FIG. 1, a processor 101 includes instruction buffers 102, an instruction decoding unit 103, an instruction execution unit 104, an instruction issuance control unit 111, and the like.

Including plural instruction buffers, the instruction buffers 102 holds the group of instructions. Here, it is assumed that they are made up of instruction buffers 102-1 to 102-3. The instruction buffer 102-1 holds an instruction code 151-1 and instruction validation information 152-1. The instruction buffer 102-2 holds an instruction code 151-2 and instruction validation information 152-2. The instruction buffer 102-3 holds an instruction code 151-3 and instruction validation information 152-3.

The instruction decoding unit 103 is made up of instruction decoders 105-1 to 105-3 and a control signal selection unit 106.

The instruction execution unit 104 is made up of an arithmetic and logic unit 107, a multiply and accumulation unit 108, a memory access control unit 109, and a register file 110. An instruction is executed by the arithmetic and logic unit 107, the multiply and accumulation unit 108, or the memory access control unit 109, and a result obtained by the execution is stored in the register file 110.

Figure 2:
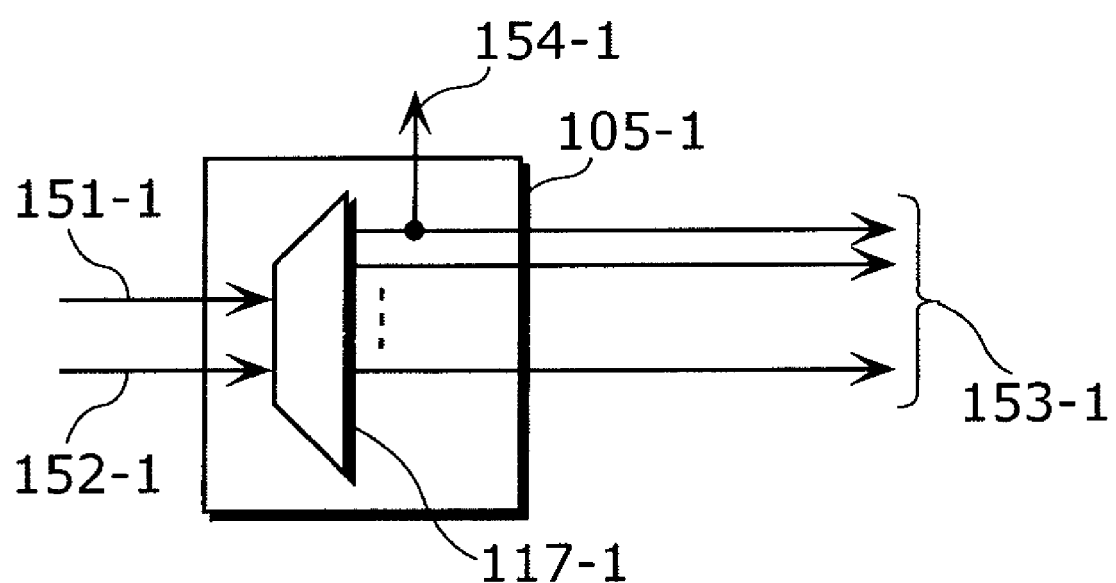
FIG. 2 is a block diagram showing a configuration of an instruction decoder according to the first embodiment.

FIG. 2 is a block diagram showing a configuration of the instruction decoders 105-1 to 105-3 according to the present embodiment. Here, the instruction decoder 105-1 is described, and the instruction decoders 105-2 and 105-3 are not described because they have the same configuration as the instruction decoder 105-1.

As shown by FIG. 2, the instruction decoder 105-1 receives the instruction code 151-1 and the instruction validation information 152-1 from the instruction buffer 102-1. At this time, when the instruction validation information 152-1 is asserted, the instruction code 151-1 is decoded. Then, instruction execution control signals 153-1 in accordance with the result of decoding is outputted to the control signal selection unit 106. In addition, when the instruction decoder 105-1 detects an instruction which can generate a structural hazard, it outputs an issuance control instruction detection signal 154-1 to the instruction issuance control unit 111. On the other hand, when the instruction validation information 152-1 is negated, the instruction code 151-1 is not decoded.

The control signal selection unit 106 receives the instruction execution control signals 153-1 to 153-3 from the instruction decoders 105-1 to 105-3 and instruction invalidation signals 155-1 to 155-3 from the instruction issuance control unit 111, and outputs instruction execution control signals 157 corresponding to one or more valid instructions to the instruction execution unit 104. Specifically, when the instruction invalidation signal 155-1 is being negated, the instruction execution control signals 157 in accordance with the instruction execution control signals 153-1 are asserted. Furthermore, the same as above applies to the instruction invalidation signal 155-2 and the instruction execution control signals 153-2, and to the instruction invalidation signal 155-3 and the instruction execution control signals 153-3. Supposedly, when the instruction invalidation signals 155-1 to 155-3 are all being negated, the instruction execution control signals 157 in accordance with all of the instruction execution control signals 153-1 to 153-3 are asserted. In other words, the instruction execution control signals 153-1 to 153-3 are combined according to a combination in which the instruction invalidation signals 155-1 to 155-3 are being negated, the instruction execution control signals 157 in accordance with the combined instruction execution control signals 153-1 to 153-3 are asserted.

Figure 3:
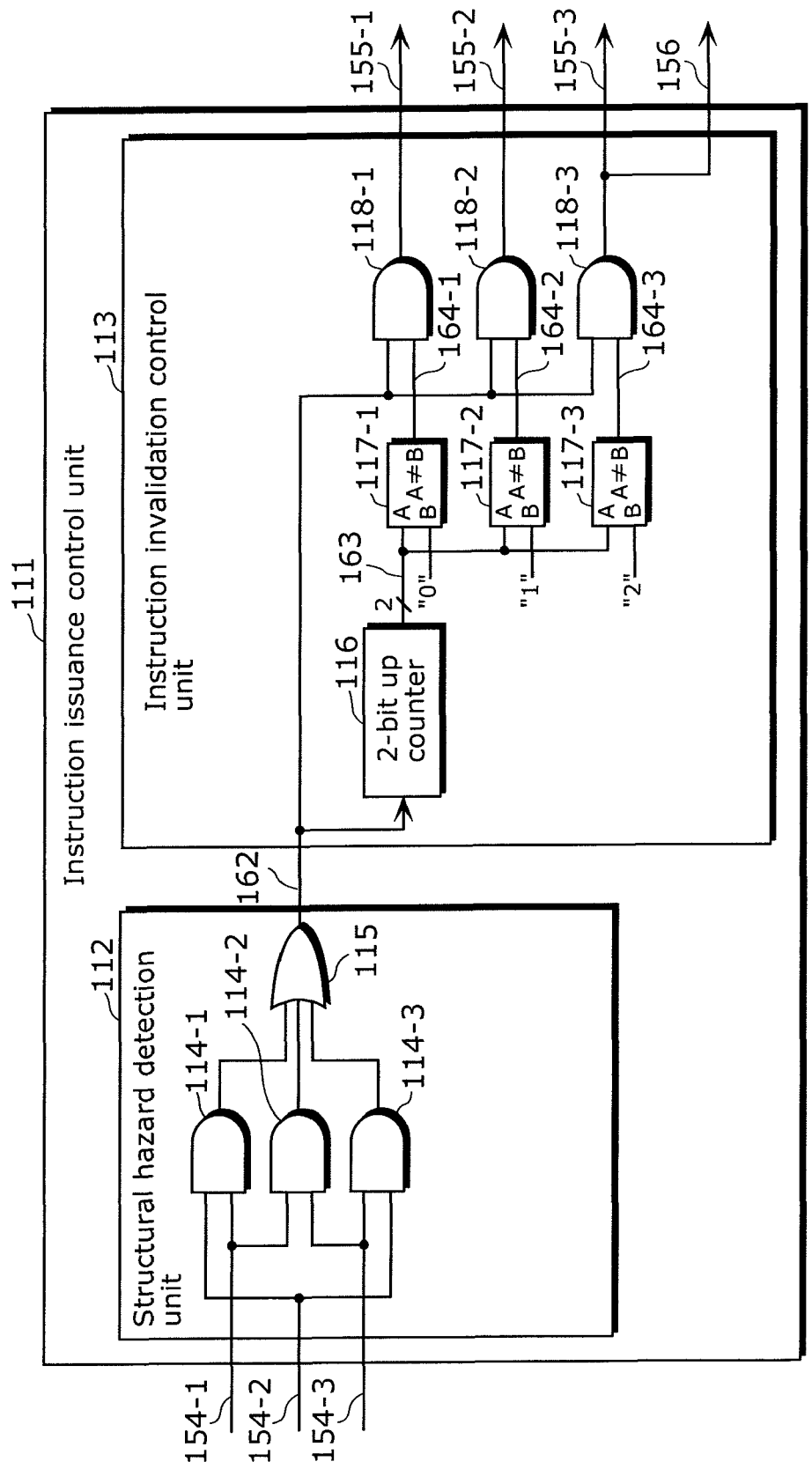
FIG. 3 is a block diagram showing a configuration of an instruction issuance control unit according to the first embodiment.

FIG. 3 is a block diagram showing a configuration of the instruction issuance control unit 111 according to the present embodiment. As shown by FIG. 3, the instruction issuance control unit 111 includes a structural hazard detection unit 112, an instruction invalidation control unit 113, and the like.

The structural hazard detection unit 112 receives issuance control instruction detection signals 154-1 to 154-3 from the instruction decoders 105-1 to 105-3, and detects presence or absence of two or more instructions targeted for issuance control between the issuance control instruction detection signal 154-1 and the issuance control detection signal 154-2, between the issuance control instruction detection signal 154-2 and the issuance control detection signal 154-3, between the issuance control instruction detection signal 154-1 and the issuance control detection signal 154-3 respectively, using AND circuits 114-1 to 114-3. Furthermore, it judges the presence or the absence of two or more instructions targeted for issuance control using an OR circuit 115, and a sequential issuance indication signal 162 in accordance with the result of judging is outputted to the instruction invalidation control unit 113. At this time, when the instructions targeted for the issuance control exist, the sequential issuance indication signal is asserted.

The instruction invalidation control unit 113 receives a sequential issuance indication signal 162 and activates a 2-bit up-counter 116 having an initial value 0. Then, the 2-bit up-counter 116 updates a counter value 163 for every machine cycle while the sequential issuance indication signal 162 is being asserted.

Comparators 117-1 to 117-3 receive the counter value 163 from the 2-bit up-counter 116. Further, the comparator 117-1 compares a value "0" with the counter value 163, and outputs the result of comparison 164-1 to an AND circuit 118-1. Similarly, the comparator 117-2 compares a value "1" with the counter value 163, and outputs the result of comparison 164-2 to an AND circuit 118-2. The comparator 117-3 compares a value "2" with the counter value 163, and outputs the result of comparison 164-3 to an AND circuit 118-3.

The AND circuits 118-1 to 118-3 receive the sequential issuance indication signal 162 from the structural hazard detection unit 112. Further, the AND circuit 118-1 receives the result of comparison 164-1 from the comparator 117-1, and outputs the instruction invalidation signal 155-1 according to AND between the sequential issuance indication signal 162 and the result of comparison 164-1. Similarly, the AND circuit 118-2 receives the result of comparison 164-2 from the comparator 117-2, and outputs the instruction invalidation signal 155-2 according to AND between the sequential issuance indication signal 162 and the result of comparison 164-2. The AND circuit 118-3 receives the result of comparison 164-3 from the comparator 117-3, and outputs the instruction invalidation signal 155-3 according to AND between the sequential issuance indication signal 162 and the result of comparison 164-3. Moreover, the AND circuit 118-3 outputs the instruction invalidation signal 155-3 as an instruction buffer update suspension signal 156.

Hereinafter, an operation of the processor configured as above is described.

FIGS. 4A and 4B show example instruction programs for describing operations, and FIGS. 5A and 5B are graphical illustrations of the operations. In FIGS. 4A, 4B, 5A, and 5B, respectively, "add" indicates an addition instruction, "mac" a multiply and accumulation instruction, and "ld" a load instruction from a memory, and all of which can be executed by the arithmetic and logic unit 107, the multiply and accumulation unit 108, and the memory access control unit 109. Here, although a program used by the processor 101 according to the first embodiment can generate only a structural hazard to the arithmetic and logic unit 107, that is, arithmetic and logic instructions may be placed in plural number in the instruction buffer 102, it is assumed that all of the instructions are placed so that other structural hazards are not generated.

With a combination of instructions (add, mac, ld) shown by FIG. 4A, since the number of the functional units that execute these instructions is sufficient, three instructions can be executed simultaneously. The instruction decoder 105-1 detects an instruction for using the arithmetic and logic unit 107, and outputs the issuance control instruction detection signal 154-1 in accordance with the result of detection to the instruction issuance control unit 111. Similarly, the instruction decoder 105-2 detects an instruction for using the multiply and accumulation unit 108, and outputs the issuance control instruction detection signal 154-2 in accordance with the result of detection to the instruction issuance control unit 111. The instruction decoder 105-3 detects an instruction for using the memory access control unit 109, and outputs the issuance control instruction detection signal 154-3 in accordance with the result of detection to the instruction issuance control unit 111.

With the combination of instructions shown by FIG. 4A, since issuance control instruction detection signals for two or more instructions are not asserted, the structural hazard detection unit 112 does not assert the sequential issuance indication signal 162. Moreover, the instruction invalidation control unit 113 does not assert the instruction invalidation signals 155-1 to 155-3 and the instruction buffer update suspension signal 156.

Along with this, the control signal selection unit 106 simultaneously outputs the instruction execution control signals 157 corresponding to all of the three instructions shown by the FIG. 4A. Then, as shown by FIG. 5A, the instruction execution unit 104 simultaneously executes these instructions.

On the other hand, with a combination of instructions (add, add, ld) shown by FIG. 4B, since there is only one arithmetic and logic unit 107 that can execute an "add" instruction, the instruction execution unit 104 cannot perform simultaneous execution. With this combination of the instructions, since the issuance control instruction detection signals for two or more instructions are asserted, the sequential issuance indication signal 162 is asserted. Moreover, the instruction invalidation control unit 113 receives the sequential issuance indication signal 162, and sequentially asserts the instruction invalidation signals 155-1 to 155-3 so that each the instructions become valid one at a time.

Along with this, the control signal selection unit 106 simultaneously outputs, to the instruction execution unit 104, the instruction execution control signals 157 corresponding to the instructions one at a time. Then, as shown by FIG. 5B, the instruction execution unit 104 executes instructions one at a time. At this time, since the instruction issuance control unit 111 suspends updating of the instruction buffers 102 until all of the instructions are issued, the instruction buffer update suspension signal 156 is asserted until the end of the second machine cycle.

As mentioned above, even though a combination of instructions that generates a structural hazard is placed in the instruction buffers 102, it becomes possible that the processor 101 avoids the structural hazard only with information about contents of the instruction buffers 102 and executes the instructions, not knowing an operation status of the instruction execution unit 104.

It should be noted that in the case where instructions of the group of instructions are sequentially supplied, it is said that the instructions are sequentially supplied one at a time. However, in the case where there are plural functional units, for example, in the case where there are two arithmetic and logic units, not only may the instructions be sequentially supplied one at a time, but also the group of instructions which is a bundle of the plural instructions each of which can be independently and simultaneously processed, such as a combination of instructions including two instructions for using the arithmetic and logic unit, may be sequentially supplied.

Second Embodiment

Next, a second embodiment according to the present invention is described with reference to the drawings.

Figure 6:
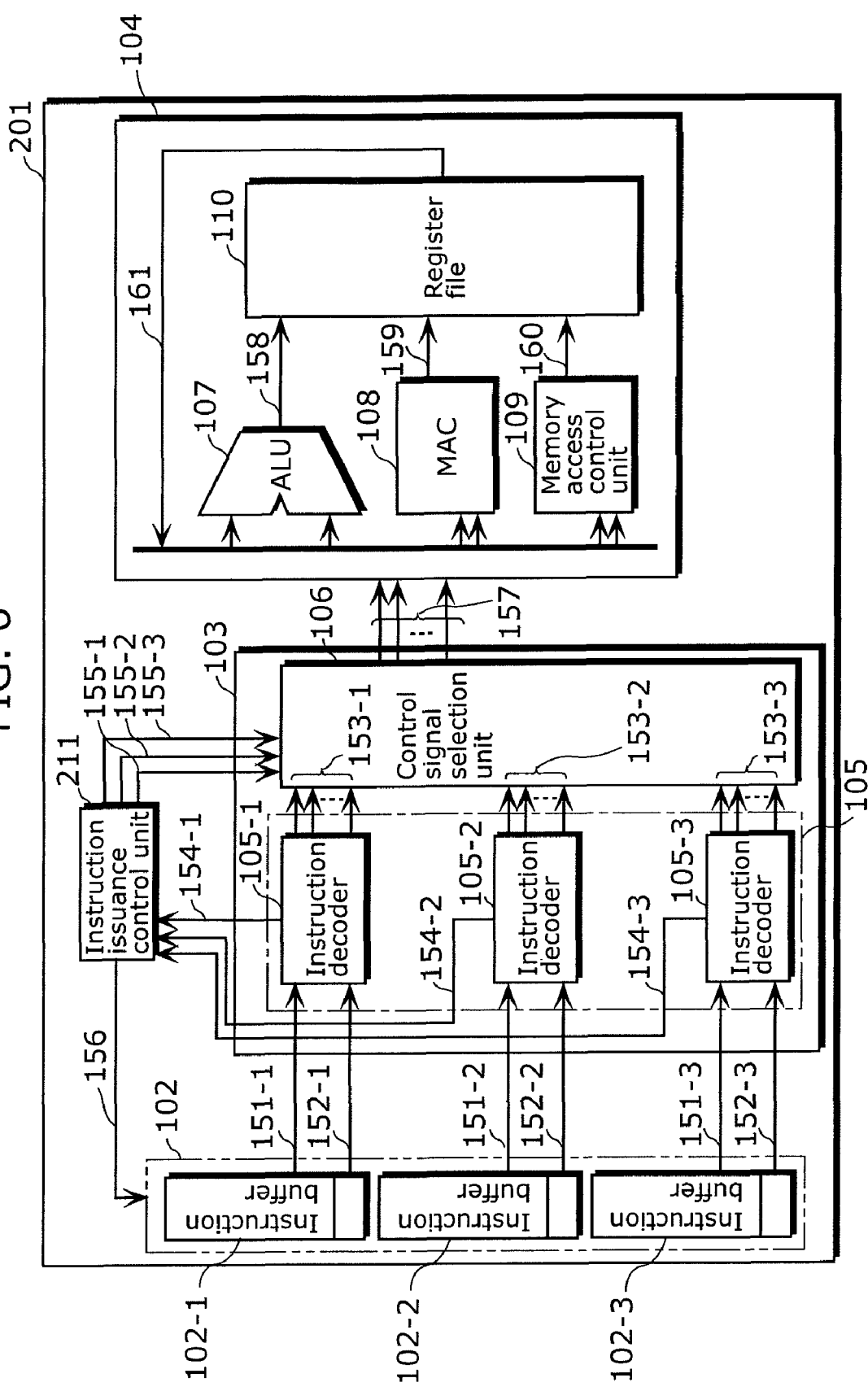
FIG. 6 is a block diagram showing a configuration of a processor according to a second embodiment.

When timing for outputting a result of decoding from the instruction decoder 105-1 to 105-3 in the processor 101 according to the first embodiment has a small margin and the instruction issuance control unit 111 is provided, there is a case where operation speed is slowed down so that operation speed specification required by a user may not be satisfied. On the other hand, as shown by FIG. 6, a processor 201 according to the second embodiment includes an instruction issuance control unit 211 instead of the instruction issuance control unit 111, and is characterized in that it is designed to solve the above problem.

In other words, the processor according to the second embodiment is characterized by detecting, as a factor, that one or more instructions which generate a structural hazard is included in a group of instructions, based on a result of decoding of the group of instructions, the result being inputted from the instruction decoding unit.

On the basis of the above points, the processor according to the second embodiment is described. It should be noted that components which are the same components of the processor 101 according to the first embodiment are given the same reference numerals and are not described.

Figure 7:
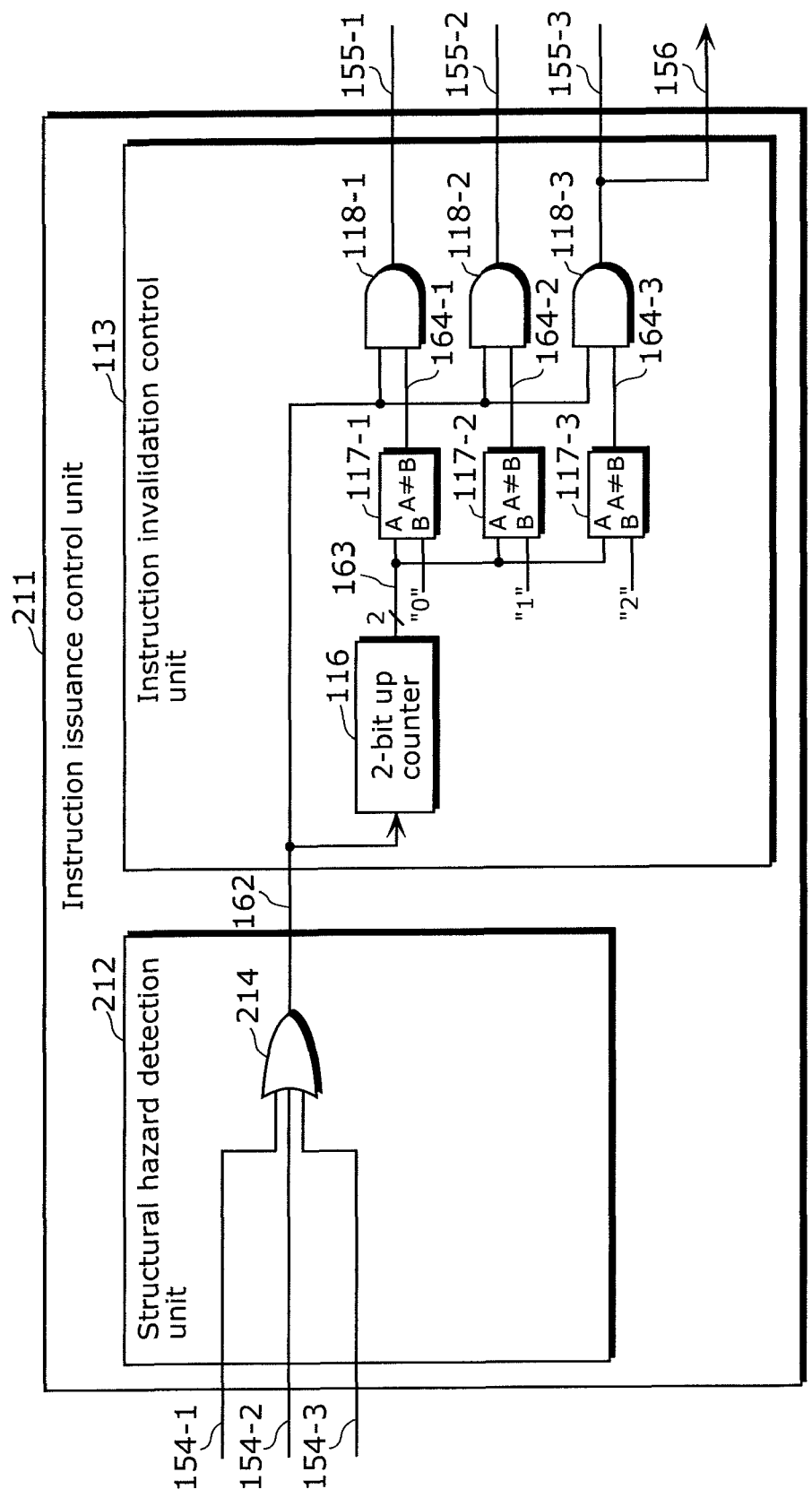
FIG. 7 is a block diagram showing a configuration of an instruction issuance control unit according to the second embodiment.

FIG. 7 is a block diagram showing a configuration of the instruction issuance control unit 211 according to the present embodiment. As shown by FIG. 7, a structural hazard detection unit 212 receives issuance control instruction detection signals 154-1 to 154-3 from instruction decoders 105-1 to 105-3, judges presence or absence of one or more instructions targeted for issuance control using an OR circuit 214, and outputs a sequential issuance indication signal 162 in accordance with the result of judging to an instruction invalidation control unit 113.

Hereinafter, an operation of the processor configured as above is described.

FIGS. 8A to 8B show example instruction programs for describing operations, and FIGS. 9A to 9B are graphical illustrations of the operations. In FIGS. 8A to 8B and FIGS. 9A to 9B, "rnd" indicates a round arithmetic instruction that can be executed by an arithmetic and logic unit 107, and "-" indicates that no instruction is placed. Here, a program to be provided to the processor 201 according to the second embodiment can generate only a structural hazard to the arithmetic and logic unit 107 with the round arithmetic instruction. That is, there may be a case where plural round arithmetic instructions are placed in the instruction buffers 102 or a case where a combination of the round arithmetic instruction and the arithmetic and logic instruction is placed simultaneously, and it is assumed that all of the instructions are placed so that the structural hazard is not generated in other cases.

On the other hand, with a combination of instructions (rnd, add, ld) shown by FIG. 8A, since in the instruction execution unit 104 there is only one arithmetic and logic unit 107 that can execute a "rnd" instruction or an "add" instruction, the instruction execution unit 104 cannot perform simultaneous execution. With this combination of the instructions, since the issuance control instruction detection signal for one or more instructions is asserted, the structural hazard detection unit 212 asserts the sequential issuance indication signal 162. Moreover, the instruction invalidation control unit 113 receives the sequential issuance indication signal 162, and sequentially asserts the instruction invalidation signals 155-1 to 155-3 so that the instructions become valid one at a time.

Along with this, the control signal selection unit 106 outputs, to the instruction execution unit 104, the instruction execution control signals 157 corresponding to the instructions one at a time. As shown by FIG. 9A, the instruction execution unit 104 executes the instructions one at a time. At this time, since the instruction issuance control unit 211 suspends updating of the instruction buffers 102 until all of the instructions are issued, the instruction buffer update suspension signal 156 is asserted until the end of the second machine cycle.

With a combination of instructions (rnd, Id, -) shown by FIG. 8B, there is only one "rnd" instruction for using the arithmetic and logic unit 107, and the structural hazard is not generated. However, since the issuance control instruction detection signal for one or more instructions is asserted, the structural hazard detection unit 212 asserts the sequential issuance indication signal 162. Furthermore, the instruction invalidation control unit 113 receives the sequential issuance indication signal 162, and sequentially asserts the instruction invalidation signals 155-1 to 155-3 so that the instructions become valid one at a time.

Along with this, the control signal selection unit 106 outputs, to the instruction execution unit 104, the instruction execution control signals 157 corresponding to the instructions one at a time. As shown by FIG. 9B, the instruction execution unit 104 executes instructions one at a time. At this time, since the instruction issuance control unit 211 suspends updating of the instruction buffers 102 until all of the instructions are issued, the instruction buffer update suspension signal 156 is asserted until the end of the second machine cycle.

It should be noted that, in the first and second embodiments according to the present invention, as shown by FIG. 8B, in the case where the instructions are not placed in all of the instruction buffers, a period of the number of the machine cycles equivalent to the number of the instructions not placed would exist as a redundant period during which nothing is issued.

As mentioned above, even though the combination of the instructions that generates the structural hazard is placed in the instruction buffers 102, it becomes possible that the processor 201 avoids the structural hazard only with information about contents of the instruction buffers 102 and executes the instructions, not knowing an operation status of the instruction execution unit 104, with the structural hazard detection unit 212 being configured by one OR circuit 214.

Third Embodiment

Next, a third embodiment according to the present invention is described with reference to the drawings.

Figure 10:
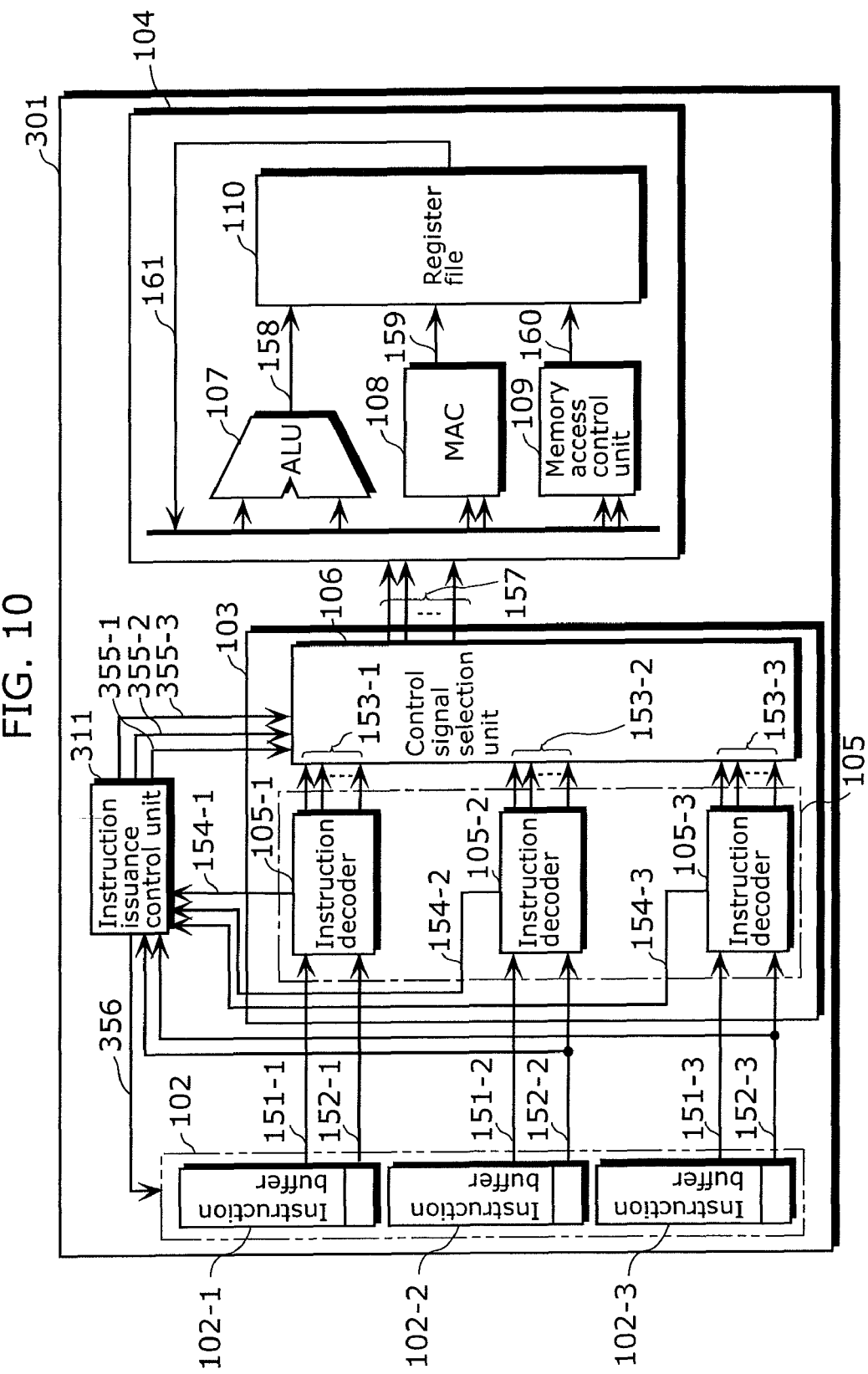
FIG. 10 is a block diagram showing a configuration of a processor according to a third embodiment.

In the case where the instructions are not placed in all of the instruction buffers of the processor 101 according to the first embodiment, a redundant period exists. On the other hand, as shown by FIG. 10, a processor 301 according to the third embodiment includes an instruction issuance control unit 311 instead of the instruction issuance control unit 111, and is characterized in that it is designed to solve the above problem.

In other words, when sequentially supplying instructions of a group of instructions, the processor according to the third embodiment is characterized by sequentially supplying, one at a time, the instructions corresponding to respective values of a counter from the group of instructions using the counter which has, as the largest value, the number of instructions held by the instruction buffers.

On the basis of the above points, the processor 301 according to the third embodiment is described. It should be noted that components which are the same components of the processor 101 according to the first embodiment are given the same reference numerals and are not described.

Figure 11:
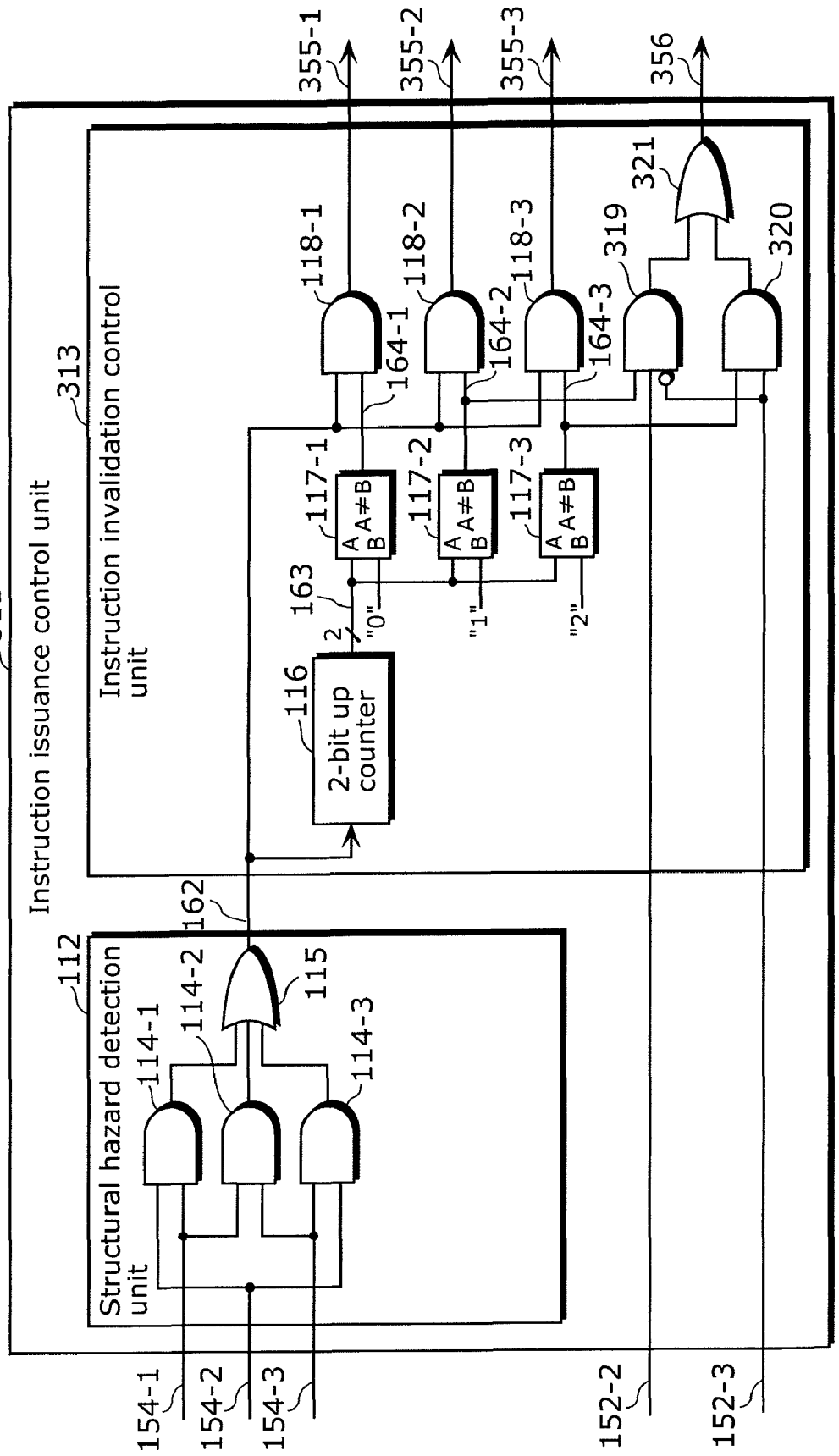
FIG. 11 is a block diagram showing a configuration of an instruction issuance control unit according to the third embodiment.

FIG. 11 is a block diagram showing a configuration of the instruction issuance control unit 311 according to the present embodiment. As shown by FIG. 11, an instruction invalidation control unit 313 receives a sequential issuance indication signal 162 and instruction validation information 152-2 and 152-3, outputs instruction invalidation signals 355-1 to 355-3 and an instruction buffer update suspension signal 356.

Hereinafter, an operation of the processor configured as above is described.

FIGS. 12A and 12B show example instruction programs for describing operations, and FIGS. 13A and 13B are graphical illustrations of the operations. Here, similar to the first embodiment according to the present invention, a program to be provided to the processor 301 according to the third embodiment can generate only a structural hazard to an arithmetic and logic unit 107. That is, arithmetic and logic instructions may be placed in plural number, and it is assumed that all of the instructions are placed so that structural hazards other than the above are not generated.

With a combination of instructions (add, add, Id) shown by FIG. 12A, since there is only one arithmetic and logic unit 107 that can execute an "add" instruction, two "add" instructions cannot be executed simultaneously. With this combination of the instructions, since issuance control instruction detection signals for two or more instructions are asserted, a structural hazard detection unit 112 asserts the sequential issuance indication signal 162. Moreover, the instruction invalidation control unit 313 receives the sequential issuance indication signal 162 and the instruction validation information 152-2 and 152-3. At this time, the instruction validation information 152-3 is also being asserted. Therefore, existence of the three instructions is detected, and the instruction invalidation signals 355-1 to 355-3 are sequentially asserted so that the instructions become valid one at a time.

Along with this, the control signal selection unit 106 simultaneously outputs, to an instruction execution unit 104, instruction execution control signals 157 corresponding to the instructions one at a time. As shown by FIG. 13A, the instruction execution unit 104 executes the instructions one at a time. At this time, since the instruction issuance control unit 311 suspends updating of instruction buffers 102 until all of the instructions are issued, an instruction buffer update suspension signal 356 is asserted until the end of the second machine cycle.

On the other hand, with a combination of instructions (add, add, -) shown by FIG. 12B, since the issuance control instruction detection signals for two or more instructions are asserted, the structural hazard detection unit 112 asserts the sequential issuance indication signal 162 similar to the combination of instructions shown by FIG. 12A.

However, the instruction invalidation control unit 313 receives the sequential issuance indication signal 162 and the instruction validation information 152-2 and 152-3. At this time, the instruction validation information 152-2 is being asserted, and the instruction validation information 152-3 is not being asserted. Therefore, existence of the two instructions is detected, and the instruction invalidation signals 355-1 to 355-3 are sequentially asserted so that the instructions become valid one at a time.

Along with this, the control signal selection unit 106 simultaneously outputs, to the instruction execution unit 104, the instruction execution control signals 157 corresponding to the instructions one at a time. As shown by FIG. 13B, the instruction execution unit 104 executes the instructions one at a time. At this time, the instruction issuance control unit 311 asserts the instruction buffer update suspension signal 356 only in the first machine cycle, and negates it in the second machine cycle. Therefore, new instructions are stored in the instruction buffers 102 in the next machine cycle.

As mentioned above, even though the combination of the instructions that generates the structural hazard is placed in the instruction buffers 102, it becomes possible that the processor 301 avoids the structural hazard only with contents of the instruction buffers 102 and sequentially executes the instructions during a period of the number of the machine cycles equivalent to the number of the instructions placed in the instruction buffers, not knowing an operation status of the instruction execution unit 104.

Fourth Embodiment

Next, a fourth embodiment according to the present invention is described with reference to the drawings.

Figure 14:
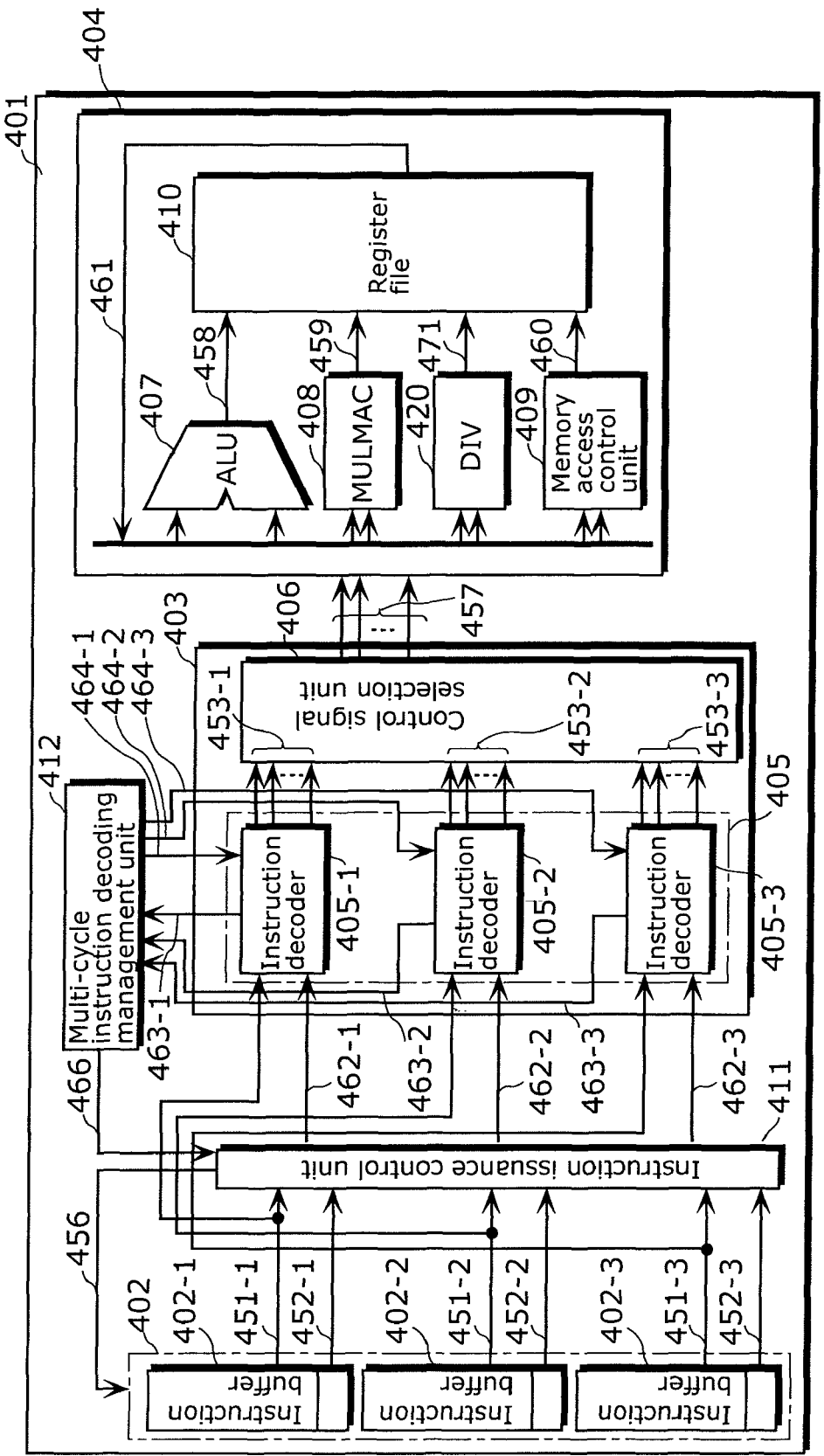
FIG. 14 is a block diagram showing a configuration of a processor according to a fourth embodiment.

A multi-cycle instruction decoding management unit performs decoding management of multi-cycle instructions by selecting one decodable instruction from plural instructions received from instruction decoders. In this case, although the multi-cycle instruction decoding management unit is simply included in the processor 101 according to the first embodiment, when the multi-cycle instructions are placed in plural number, since a conflict occurs among the plural multi-cycle instructions at the time of instruction selection by the multi-cycle instruction decoding management unit, the decoding management cannot be performed and applied. On the other hand, as shown by FIG. 14, a processor 401 according to the fourth embodiment includes instruction buffers 402, an instruction decoding unit 403, an instruction execution unit 404, an instruction issuance control unit 411, a multi-cycle instruction decoding management unit, and the like, instead of the instruction buffers 102, the instruction decoding unit 103, the instruction execution unit 104, and the instruction issuance control unit 111; and is characterized in that it is designed to solve the above problem.

In other words, the processor according to the fourth embodiment is characterized by detecting, as a factor, that the predetermined number of the multi-cycle instructions is included in a group of instructions, based on a result of pre-decoding of the group of instructions, the result being inputted from the instruction buffers.

Here, upon the pre-decoding, it is assumed to specify at least whether or not there is a multi-cycle instruction.

"Multi-cycle instruction" is an instruction for which plural arithmetic computations are executed one at a time. It should be noted that the arithmetic computations to be executed is also called micro-operations.

On the basis of the above points, the processor 401 according to the fourth embodiment is described. It should be noted that components which are the same components of the processor 101 according to the first embodiment are given the same reference numerals and are not described.

FIG. 14 is a block diagram showing a configuration of the processor according to the present embodiment. As shown by FIG. 14, the processor 401 includes the instruction buffers 402, the instruction decoding unit 403, the instruction execution unit 404, the instruction issuance control unit 411, the multi-cycle instruction decoding management unit 412, and the like.

Including plural instruction buffers, the instruction buffers 402 hold the group of instructions. Here, it is assumed that they are made up of instruction buffers 402-1 to 402-3. The instruction buffers 402-1 to 402-3 hold instruction codes 451-1 to 451-3 and instruction validation information 452-1 to 452-3.

The instruction decoding unit 403 is made up of instruction decoders 405-1 to 405-3 and a control signal selection unit 406.

The instruction decoders 405-1 to 405-3 receive the instruction codes 451-1 to 451-3 from the instruction buffers 402-1 to 402-3 and instruction validation information 462-1 to 462-3 from the instruction issuance control unit 411. Moreover, the instruction decoders 405-1 to 405-3 output, as multi-cycle instruction signals 463-1 to 463-3, a result of detection of the multi-cycle instructions, out of results of decoding, to the multi-cycle instruction decoding management unit 412, and receive micro-operation signals 464-1 to 464-3 from the multi-cycle instruction decoding management unit 412. Then, the instruction decoders 405-1 to 405-3 output, to a control signal selection unit 406, instruction execution control signals 453-1 to 453-3 in accordance with the information from the instruction buffers 402-1 to 402-3 and the micro-operation indication signals 464-1 to 464-3.

The control signal selection unit 406 receives instruction execution control signals 453-1 to 453-3 from the instruction decoders 405-1 to 405-3, and outputs, to the instruction execution unit 404, the instruction execution control signals 457 corresponding to one or more valid instructions.

The instruction execution unit 404 is made up of an arithmetic and logic unit 407, a multiply and accumulation unit 408, a memory access control unit 409, a register file 410, and a division unit 420, and executes instructions and stores the results of execution.

The multi-cycle instruction decoding management unit 412 receives the multi-cycle instruction signals 463-1 to 463-3 from the instruction decoders 405-1 to 405-3, and outputs the micro-operation indication signals 464-1 to 464-3 to the instruction decoders 405-1 to 405-3 and a counter update suspension signal 466 to the instruction issuance control unit 411.

Figure 15:
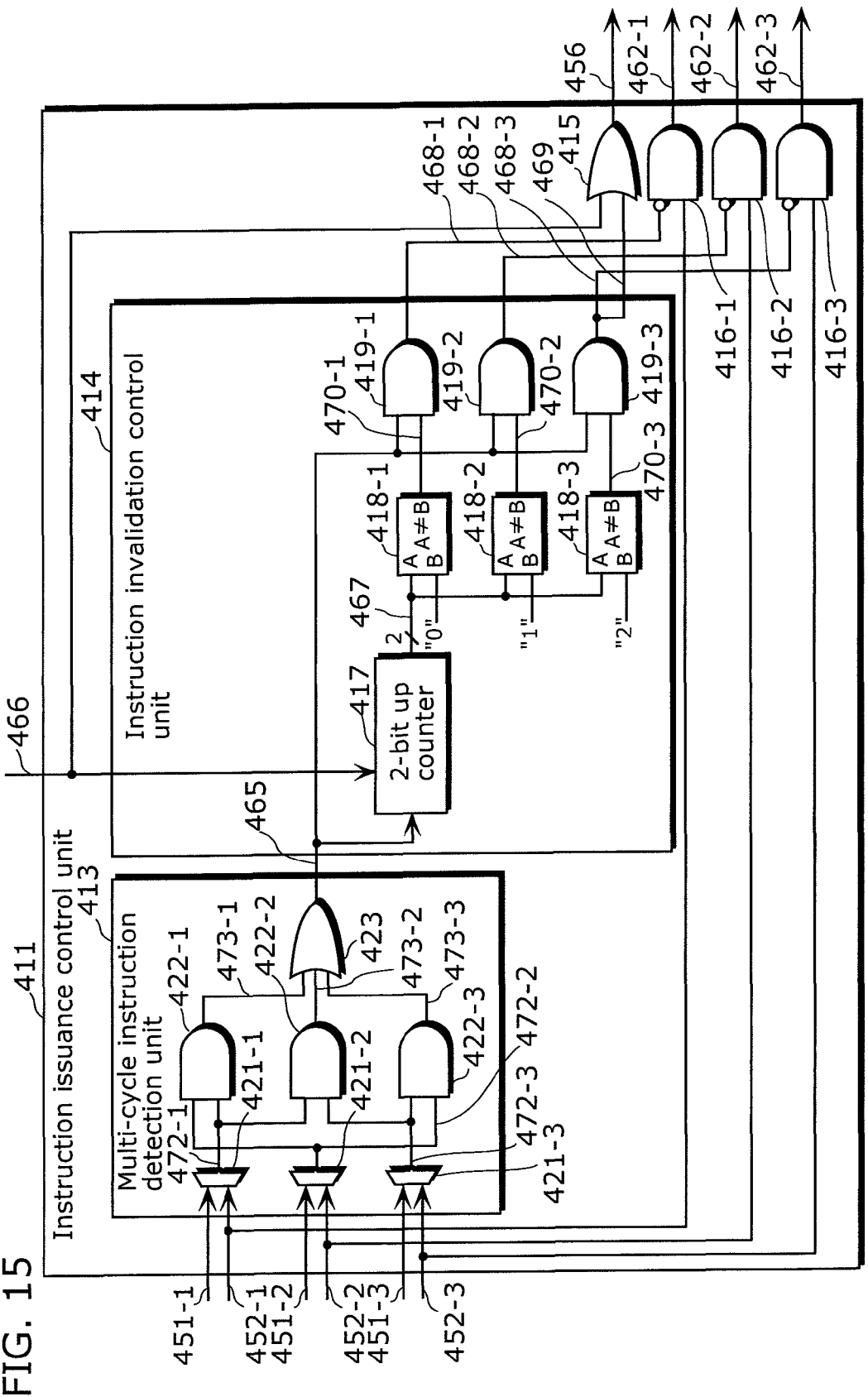
FIG. 15 is a block diagram showing a configuration of an instruction issuance control unit according to the fourth embodiment.

FIG. 15 is a block diagram showing a configuration of the instruction issuance control unit 411 according to the present embodiment. As shown by FIG. 15, the instruction issuance control unit 411 includes a multi-cycle instruction detection unit 413, an instruction invalidation control unit 414, an OR circuit 415, AND circuits 416-1 to 416-3, and the like.

The AND circuit 416-1 receives the instruction validation information 452-1 from the instruction buffer 402-1 and an instruction invalidation signal 468-1 from the instruction invalidation control unit 414. Then, it outputs, to the instruction decoder 405-1, instruction validation information 462-1 in accordance with AND between the instruction invalidation signal 468-1 that is inverted and the instruction validation information 452-1. Likewise, the AND circuit 416-2 outputs, to the instruction decoder 405-2, instruction validation information 462-2 in accordance with AND between the instruction invalidation signal 468-2 that is inverted and the instruction validation information 452-2 that is received from the instruction buffer 402-2, the instruction invalidation signal 468-2 being received from the instruction invalidation control unit 414. The AND circuit 416-3 outputs, to the instruction decoder 405-3, instruction validation information 462-3 in accordance with AND between the instruction invalidation signal 468-3 that is inverted and the instruction validation information 452-3 that is received from the instruction buffer 402-2, the instruction invalidation signal 468-3 being received from the instruction invalidation control unit 414.

The OR circuit 415 receives the counter update suspension signal 466 from the multi-cycle instruction decoding management unit 412 and an instruction buffer update suspension signal 469 from the instruction invalidation control unit 414. Then, it outputs a instruction buffer update suspension signal 456 in accordance with OR between the counter update suspension signal 466 and the instruction buffer update suspension signal 469 to the instruction buffers 402.

The multi-cycle instruction detection unit 413 receives the instruction code 451-1 and the instruction validation information 452-1 from the instruction buffer 402-1. Moreover, it receives the instruction code 451-2 and the instruction validation information 452-2 from the instruction buffer 402-2. It receives the instruction code 451-3 and the instruction validation information 452-3 from the instruction buffer 402-1. Further, it detects multi-cycle instructions that are placeable in plural number using multi-cycle instruction detection decoders 421-1 to 421-3. It detects presence or absence of two multi-cycle instructions using AND circuits 422-1 to 422-3. It judges presence or absence of the multi-cycle instructions that are placeable in plural number using an OR circuit 423, the plural number being equal to or more than two. Then, it outputs a sequential issuance indication signal 465 in accordance with the result of judging.

The instruction invalidation control unit 414 receives the sequential issuance indication signal 465 from the multi-cycle instruction detection unit 413 and the counter update suspension signal 466 from the multi-cycle instruction decoding management unit 412, and activates a 2-bit up-counter 417 having an initial value 0. Then, the 2-bit up-counter 417 updates a counter value in a period when the sequential issuance indication signal 465 is being asserted and in a machine cycle when the counter update suspension signal 466 is being negated.

Comparators 418-1 to 418-3 receive a counter value 467 from the 2-bit up-counter 417. Further, the comparator 418-1 compares a value "0" with the counter value 467, and outputs the result of comparison 470-1 to an AND circuit 419-1. Similarly, the comparator 418-2 compares a value "1" with the counter value 467, and outputs the result of comparison 470-2 to an AND circuit 419-2. The comparator 418-3 compares a value "2" with the counter value 467, and outputs the result of comparison 470-3 to an AND circuit 419-3.

The AND circuits 419-1 to 419-3 receive the sequential issuance indication signal 465 from the multi-cycle instruction detection unit 413. Further, the AND circuit 419-1 receives the result of comparison 470-1 from the comparator 418-1, and outputs an instruction invalidation signal 468-1 according to AND between the sequential issuance indication signal 465 and the result of comparison 470-1. Likewise, the AND circuit 419-2 receives the result of comparison 470-2 from the comparator 418-2, and outputs an instruction invalidation signal 468-2 according to AND between the sequential issuance indication signal 465 and the result of comparison 470-2. The AND circuit 419-3 receives the result of comparison 470-3 from the comparator 418-3, and outputs an instruction invalidation signal 468-3 according to AND between the sequential issuance indication signal 465 and the result of comparison 470-3. Furthermore, the AND circuit 419-3 outputs the instruction invalidation signal 468-3 as an instruction buffer update suspension signal 469 to the OR circuit 415.

Hereinafter, an operation of the processor configured as above is described.

Figure 16A:
FIG. 16A is a view showing an example program for describing the fourth embodiment.
Figure 16B:
FIG. 16B is a view showing an example program for describing the fourth embodiment.

FIGS. 16A and 16B show example instruction programs for describing operations, and FIGS. 17A and 17B are graphical illustrations of the operations. In the FIGS. 16A, 16B, FIGS. 17A, and 17B, "div" indicates a division instruction, is a multi-cycle instruction to be managed by the multi-cycle instruction decoding management unit 412, and can be executed by a division unit 420, the multi-cycle instruction having n-cycle. Here, with a program used by the processor 401 according to the fourth embodiment, it is assumed that only division computation among the multi-cycle instructions may be placed in plural number in the instruction buffers 402 and that other multi-cycle instructions are placed not to be placed in plural number in the instruction buffers 402.

With a combination of instructions (add, div, Id) shown by FIG. 16A, since there is one "div" instruction which is a multi-cycle instruction, the multi-cycle instruction detection unit 413 negates the sequential issuance indication signal 465. Therefore, since the instruction validation information 462-1 to 462-3 are asserted simultaneously, instruction codes 451-1 to 451-3 are decoded simultaneously by the instruction decoders 405-1 to 405-3.

At this time, the multi-cycle instruction decoding management unit 412 performs decoding management upon receiving a multi-cycle instruction signal 464-2 caused by one multi-cycle instruction "div". While performing the decoding management on the multi-cycle instructions, and not in a period for the final micro-operation of the multi-cycle instruction, the multi-cycle instruction decoding management unit 412 asserts a counter update suspension signal 466. Since the instruction buffer update suspension signal 469 is being negated, the instruction issuance control unit 411 outputs the counter update suspension signal 466 simply as an instruction buffer update suspension signal 456.

Along with this, a control signal selection unit 406 simultaneously outputs, with respect to the combination of these instructions, instruction execution control signals 157 corresponding to each instruction to the instruction execution unit 404. Then, as shown by FIG. 17A, the instruction execution unit 404 executes each instruction simultaneously with respect to the combination of these instructions.

On the other hand, with a combination of instructions (add, div, div) shown by FIG. 16B, since there are two "div" instructions which are multi-cycle instructions, the multi-cycle instruction detection unit 413 asserts the sequential issuance indication signal 465. Consequently, since, among the instruction validation information 462-1 to 462-3, only the instruction validation information 462-1 corresponding to an "add" instruction is asserted when the counter value 467 is "0", only the instruction code 451-1 is decoded by the instruction decoder 405-1.

Further, since there is no valid multi-cycle instruction, the multi-cycle instruction decoding management unit 412 negates the counter update suspension signal 466. For this reason, the counter value 467 is updated to "1" in next machine cycle. As a result, since, among the instruction validation information 462-1 to 462-3, only the instruction validation information 462-2 corresponding to the first "div" instruction is asserted when the counter value 467 is "1", only the instruction code 451-2 is decoded by the instruction decoder 405-2.

Further, since there is a valid multi-cycle instruction "div", the multi-cycle instruction decoding management unit 412 asserts the counter update suspension signal 466. For this reason, updating of the 2-bit up-counter 417 is suspended until decoding management of the first "div" is completed. When the final macro-operation of the first "div" is started, since the multi-cycle instruction decoding management unit 412 negates the counter update suspension signal 466, the counter value 467 is updated to "2" in the next machine cycle. Consequently, since the instruction validation information 462-3 corresponding to the second "div" instruction is asserted, only the instruction code 451-3 is decoded by the instruction decoder 405-3.

Since there is the valid multi-cycle instruction "div", the multi-cycle instruction decoding management unit 412 asserts the counter update suspension signal 466. For this reason, updating of the 2-bit up-counter 417 is suspended until decoding management of the second "div" is completed. When the final macro-operation of the second "div" is started, since the multi-cycle instruction decoding management unit 412 negates the counter update suspension signal 466, the instruction buffer update suspension signal 456 is also negated, and the instruction buffers 402 are updated in the next machine cycle.

Along with this, the control signal selection unit 406 simultaneously outputs, to the instruction execution unit 404, the instruction execution control signals 457 corresponding to the instructions one at a time. Then, as shown by FIG. 17B, the instruction execution unit 404 executes the instructions one at a time.

As mentioned above, even though the plural multi-cycle instructions are placed in the instruction buffers 402, it becomes possible that the processor 401 executes the instructions by sequentially issuing the instructions only with contents of the instruction buffers 402 and the counter update suspension signal 466 received from the multi-cycle instruction decoding management unit 412, not knowing an operation status of the instruction execution unit 404.

Fifth Embodiment

Next, a fifth embodiment according to the present invention is described with reference to the drawings.

Figure 18:
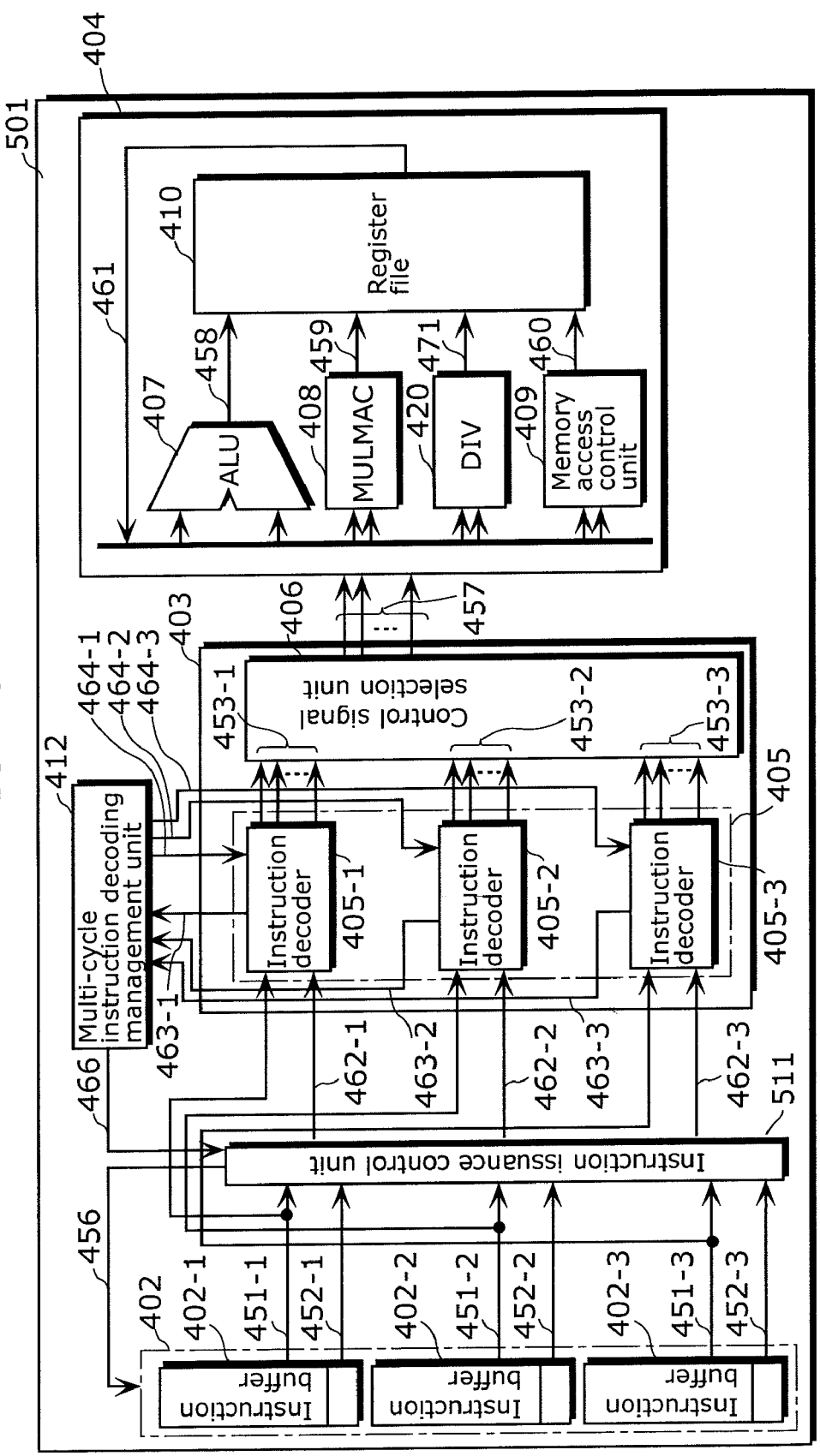
FIG. 18 is a block diagram showing a configuration of a processor according to a fifth embodiment.

When timing for outputting the instruction validation information 462-1 to 462-3 in the processor 401 according to the fourth embodiment has a small margin and the instruction issuance control unit 411 is provided, there is a case where operation speed is slowed down so that operation speed specification required by a user may not be satisfied. On the other hand, as shown by FIG. 18, a processor 501 according to the fifth embodiment includes an instruction issuance control unit 511 instead of the instruction issuance control unit 411, and is characterized in that it is designed to solve the above problem.

In other words, the processor according to the fifth embodiment is characterized by detecting, as a factor, that one or more multi-cycle instructions are included in a group of instructions, based on a result of pre-decoding of the group of instructions, the result being inputted from an instruction buffer.

Here, upon the pre-decoding, it is assumed to specify at least whether or not there is a multi-cycle instruction.

On the basis of the above points, the processor 501 according to the fifth embodiment is described. It should be noted that components which are the same components of the processor 401 according to the first embodiment are given the same reference numerals and are not described.

Figure 19:
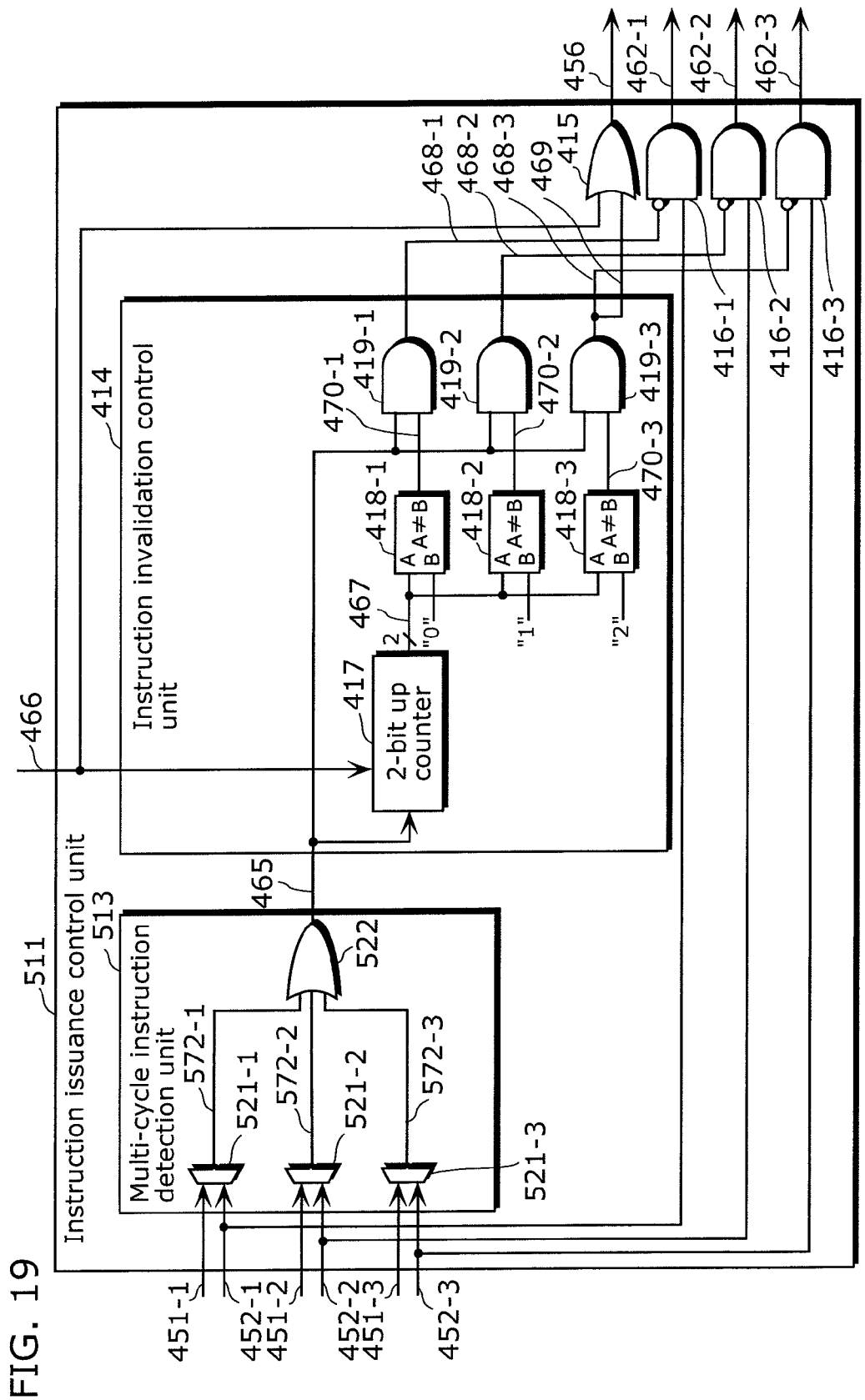
FIG. 19 is a block diagram showing a configuration of an instruction issuance control unit according to the fifth embodiment.

FIG. 19 is a block diagram showing a configuration of the instruction issuance control unit 511 according to the present embodiment. As shown by FIG. 19, a multi-cycle instruction detection unit 513 receives instruction codes 451-1 to 451-3 from instruction buffers 402-1 to 402-3 and instruction validation information 452-1 to 452-3, and detects the multi-cycle instructions that are placeable in plural number using multi-cycle instruction detection decoders 521-1 to 521-3. Further, it judges presence or absence of the multi-cycle instructions that are placeable in plural number using an OR circuit 522, the plural number being equal to or more than one, and outputs the result of judging as a sequential issuance indication signal 465 to an instruction invalidation control unit 414.

Hereinafter, an operation of the processor configured as above is described.

Figure 20A:
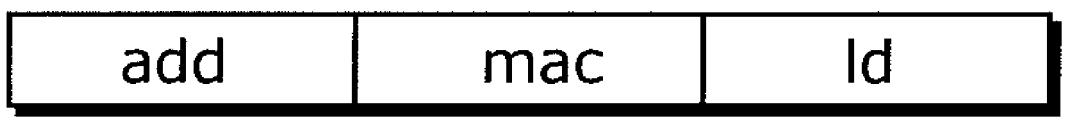
FIG. 20A is a view showing an example program for describing the fifth embodiment.
Figure 20B:
FIG. 20B is a view showing an example program for describing the fifth embodiment.
Figure 20C:
FIG. 20C is a view showing an example program for describing the fifth embodiment.

FIGS. 20A to 20C show example instruction programs for describing operations, and FIGS. 21A to 21C are graphical illustrations of the operations. Here, with a program used by the processor 501 according to the fifth embodiment, it is assumed that only division computation among the multi-cycle instructions may be placed in plural number in the instruction buffers 402 and that other multi-cycle instructions are placed not to be placed in plural number in the instruction buffers 402.

With a combination of instructions (add, mac, Id) shown by FIG. 20A, since the multi-cycle instructions that are placeable in plural number are not detected, the multi-cycle instruction detection unit 513 negates a sequential issuance indication signal 465.

Along with this, a control signal selection unit 406 simultaneously outputs, with respect to a combination of these instructions, instruction execution control signals 457 corresponding to each instruction to an instruction execution unit 404. Then, as shown by FIG. 21A, the instruction execution unit 404 executes each instruction simultaneously with respect to the combination of these instructions.

On the other hand, with a combination of instructions (add, div, div) shown by FIG. 20B, since there are two multi-cycle instructions that are placeable in plural number, the multi-cycle instruction detection unit 513 asserts the sequential issuance indication signal 465.

Along with this, the control signal selection unit 406 simultaneously outputs, to the instruction execution unit 404, the instruction execution control signals 457 corresponding to the instructions one at a time. Then, as shown by FIG. 21B, the instruction execution unit 404 executes the instructions one at a time.

With a combination of instructions (add, div, Id) shown by FIG. 20C, since in the multi-cycle instruction detection unit 513 there is only one multi-cycle instruction that is placeable in plural number, even when the combination of instructions shown by FIG. 20C is supplied to an instruction decoding unit 405, it can be controlled by a multi-cycle instruction decoding management unit 412. However, the multi-cycle instruction detection unit 513 detects multi-cycle instructions that are placeable in plural number, the plural number being equal to or more than one, and asserts the sequential issuance indication signal 465.

Along with this, the control signal selection unit 406 simultaneously outputs, to the instruction execution unit 404, the instruction execution control signals 457 corresponding to the instructions one at a time. Then, as shown by FIG. 21C, the instruction execution unit 404 executes the instructions one at a time.

As mentioned above, even though the plural multi-cycle instructions are placed in the instruction buffers 402, it becomes possible that the processor 501 avoids the structural hazard with contents of the instruction buffers 402 and executes the instructions, not knowing an operation status of the instruction execution unit 404 and being configured with the multi-cycle instruction detection decoders 521-1 to 521-3 and one OR circuit 522.

It should be noted that, in the fourth and fifth embodiments according to the present invention, in the case where all of the instructions are not placed in the instruction buffers, a period of the number of the machine cycles equivalent to the number of the instructions not placed exists as a redundant period during which nothing is issued. On the other hand, the redundant period can be removed by adding the instruction validation information 452-2 to 452-3 to an instruction invalidation control unit 414 and performing the same control as the instruction issuance control unit 313 does in the third embodiment according to the present invention.

Sixth Embodiment

Next, a sixth embodiment according to the present invention is described with reference to the drawings.

Figure 22:
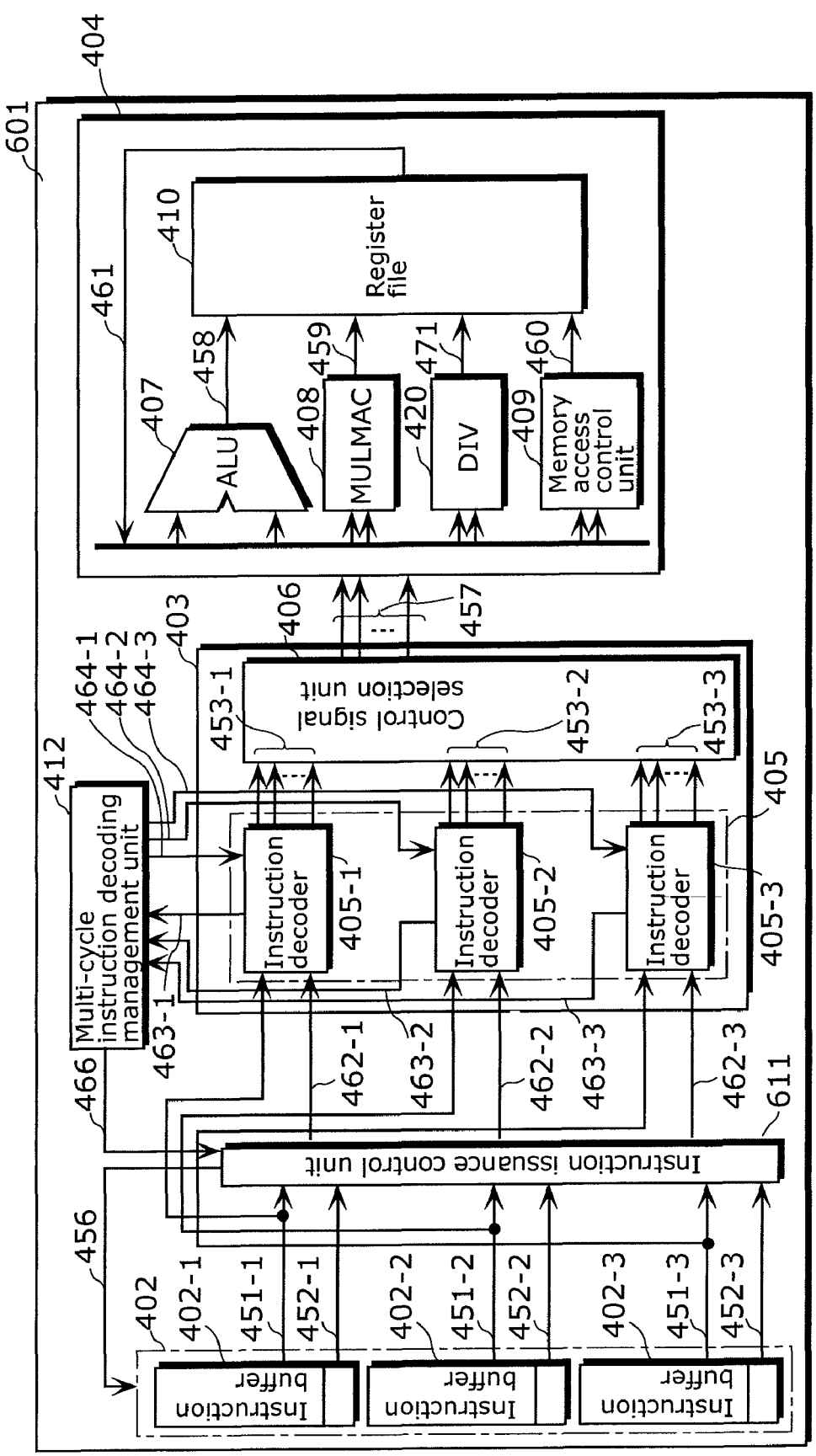
FIG. 22 is a block diagram showing a configuration of a processor according to a sixth embodiment.

With the processor 401 according to the fourth embodiment, when the multi-cycle instruction detection unit 413 asserts the sequential issuance indication signal 465, not only the multi-cycle instructions but also single-cycle instructions that can be executed with the multi-cycle instructions simultaneously are sequentially supplied one at a time. On the other hand, as shown by FIG. 22, a processor 601 according to the sixth embodiment includes an instruction issuance control unit 611 instead of the instruction issuance control unit 411, and is characterized in that it is designed to solve the above problem.

In other words, when sequentially supplying instructions of a group of instructions, the processor according to the sixth embodiment is characterized by dividing the group of instructions into sub-groups of instructions having one or less multi-cycle instruction and by sequentially supplying the sub-groups of instructions corresponding to respective values of a counter using the counter which has, as the largest value, the number of the multi-cycle instructions.

On the basis of the above points, the processor 601 according to the sixth embodiment is described. It should be noted that components which are the same components of the processor 401 according to the fourth embodiment are given the same reference numerals and are not described.

Figure 23:
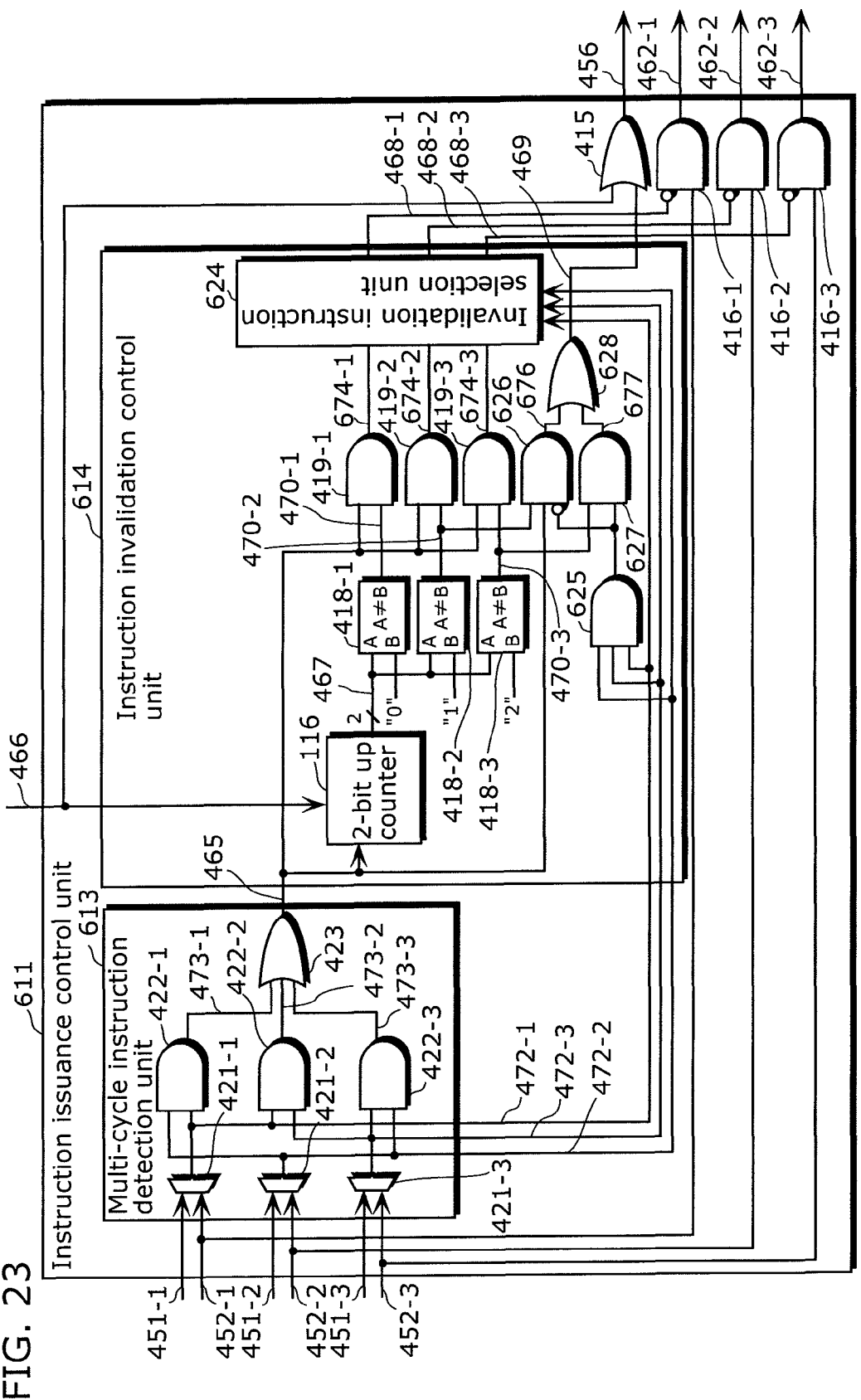
FIG. 23 is a block diagram showing a configuration of an instruction issuance control unit according to the sixth embodiment.

FIG. 23 is a block diagram showing a configuration of an instruction issuance control unit 611 according to the present embodiment. As shown by FIG. 23, the instruction issuance control unit 611 is made up of a multi-cycle instruction detection unit 613 and an instruction invalidation control unit 614.

The multi-cycle instruction detection unit 613 receives instruction codes 451-1 to 451-3 and instruction validation information 452-1 to 452-3 from instruction buffers 402-1 to 402-3, and detects multi-cycle instructions that are placeable in plural number using multi-cycle instruction detection decoder 421-1 to 421-3. Further, it outputs multi-cycle instruction detection signals 472-1 to 472-3 to the instruction invalidation control unit 614. Moreover, it detects presence or absence of two multi-cycle instructions using AND circuits 422-1 to 422-3 to which the multi-cycle instruction detection signals 472-1 to 472-3 are inputted, and judges presence or absence of the multi-cycle instructions that are placeable in plural number using an OR circuit 423, the plural number being equal to or more than two. Then, it outputs the result of judging as a sequential issuance indication signal 465 to the instruction invalidation control unit 614.

The instruction invalidation control unit 614 receives the sequential issuance indication signal 465 and the multi-cycle instruction detection signals 472-1 to 472-3 from the multi-cycle instruction detection unit 613, and a counter update suspension signal 466 from a multi-cycle instruction decoding management unit 412. Further, it activates a 2-bit up-counter 417 having an initial value "0". Then, the 2-bit up-counter 417 updates a counter value in a period during which the sequential issuance indication signal 465 is being asserted and in a machine cycle during which a counter update suspension signal 466 is being negated.

Comparators 418-1 to 418-3 receive a counter value 467 from the 2-bit up-counter 417, compare the counter value 467 with respective values "0", "1", and "2", and output results of comparison 470-1 to 470-3 to AND circuits 419-1 to 419-3.

The AND circuits 419-1 to 419-3 receive the results of comparison 470-1 to 470-3 from the comparators 418-1 to 418-3 and the sequential issuance indication signal 465 from the multi-cycle instruction detection unit 613, perform AND between the results of comparison 470-1 to 470-3 and the sequential issuance indication signal 465, and supplies results of AND as sub-group of instructions invalidation signals 674-1 to 674-3 to an invalidation instruction selection unit 624.

Based on a truth table shown by FIG. 24, the invalidation instruction selection unit 624 selects one from the sub-group of instructions invalidation signals 674-1 to 674-3 in accordance with the multi-cycle instruction detection signals 472-1 to 472-3 and outputs it as the instruction invalidation signals 468-1 to 468-3

When the counter value 467 is "0" in the case of two multi-cycle instructions and when the counter value 467 is "0" or "1" in the case of three multi-cycle instructions, AND circuits 625 to 627 and an OR circuit 628 are configured to assert a buffer update suspension signal 456.

Hereinafter, an operation of the processor configured as above is described.

Figure 25A:
FIG. 25A is a view showing an example program for describing the sixth embodiment.
Figure 25B:
FIG. 25B is a view showing an example program for describing the sixth embodiment.

FIGS. 25A and 25B show example instruction programs for describing operations, and FIGS. 26A and 26B are graphical illustrations of the operations. Here, with a program used by the processor 601 according to the sixth embodiment, it is assumed that only division computation among the multi-cycle instructions may be placed in plural number in the instruction buffers 402 and that other multi-cycle instructions are placed not to be placed in plural number in the instruction buffers 402.

With a combination of instructions (add, mac, Id) shown by FIG. 25A, since the multi-cycle instructions that are placeable in plural number are not detected, the multi-cycle instruction detection unit 613 negates a sequential issuance indication signal 465. Therefore, since the instruction validation information 462-1 to 462-3 are asserted simultaneously, instruction codes 451-1 to 451-3 are decoded simultaneously by instruction decoders 405-1 to 405-3.

Along with this, a control signal selection unit 406 simultaneously outputs, with respect to a combination of these instructions, instruction execution control signals 457 corresponding to each instruction to an instruction execution unit 404. Then, as shown by FIG. 26A, the instruction execution unit 404 executes each instruction with respect to the combination of these instructions.

With a combination of instructions (add, div, div) shown by FIG. 25B, the multi-cycle instruction detection unit 613 detects two or more multi-cycle instructions that are placeable in plural number and asserts the sequential issuance indication signal 465. At this time, the multi-cycle instruction detection unit 613 also asserts the multi-cycle instruction detection signals 472-2 and 472-3.

Moreover, since there are two multi-cycle instructions, the instruction invalidation control unit 614 asserts the buffer update suspension signal 456 only when the counter value 467 is "0".

Since the multi-cycle instruction detection signals 472-1 to 472-3 are "0", "1", and "1" respectively, as shown by FIG. 24, the invalidation instruction selection unit 624 selects and outputs the sub-group of instructions invalidation signals 674-1, 674-1, and 674-2 respectively for the instruction invalidation signals 468-1 to 468-3.

As a result, as shown by FIG. 26B, first, an "add" instruction and the first "div" instruction are supplied to an instruction decoding unit 403, and then the second "div" instruction is supplied to the instruction decoding unit 403. It should be noted that the "add" instruction which is a single-cycle instruction simultaneously supplied with the first "div" instruction is assumed to be issued simultaneously with the final micro-operation of a "div" instruction by a multi-cycle instruction decoding management unit 412 after being simultaneously supplied with the first "div" instruction to the instruction decoding unit 403.

As mentioned above, even in the case where the plural multi-cycle instructions are placed in the instruction buffers 402, it becomes possible that the processor 601 avoids the structural hazard with information only about contents of the instruction buffers 402 and executes the instructions in the smallest number of the cycles that can be executed by simultaneously supplying the largest number of the instructions that can be executed simultaneously, not knowing an operation status of the instruction execution unit 404.

It should be noted that adding the issuance control instruction detection signals 154-1 to 154-3 as inputs to the instruction invalidation control unit 313 and configuring the instruction invalidation control unit 313 the same as the instruction invalidation control unit 614 allow the processor in the third embodiment according to the present invention to simultaneously supply the largest number of the instructions that can be executed simultaneously. Consequently, it becomes possible that the processor executes instructions in the smallest number of the cycles that can be executed.

It should be noted that, just like the processor according to the sixth embodiment, when sequentially supplying instructions of the group of instructions, the processor according to the first embodiment may divide the group of instructions into sub-groups of instructions having one or less multi-cycle instruction that can generate the structural hazard and sequentially supply the sub-groups of instructions corresponding to respective values of a counter, using the counter which has, as the largest value, the number of the multi-cycle instructions that can generate the structural hazard.

(Other)

It should be noted that the processor according to the present invention may be realized with a full-custom Large Scale Integration (LSI). Furthermore, it may be realized with a semi-custom LSI such as Application Specific Integrated Circuit (ASIC). Moreover, it may be realized with programmable logic devices such as Field Programmable Gate Array (FPGA) and Complex Programmable Logic Device (CPLD). In addition, it may be realized as a dynamic reconfigurable device which allows re-writing of a circuit configuration dynamically.

Further, design data that form one or more functions for configuring the processor according to the present invention on these LSIs may be a program (hereinafter, referred to an HDL program) written in hardware description languages such as Very High Speed Integrated Circuit Hardware Description Language (VHDL), Verilog-HDL, and SystemC. Moreover, they may be a net list of a gate level obtained by logically synthesizing the HDL program. Furthermore, they may be macrocell information obtained by adding placement information, process conditions, and the like to the net list of the gate level. In addition, they may be mask data to which size, timing, and the like are specified.

Further, the design data may be recorded in a computer-readable recording medium, such as optical recording medium (e.g. CD-ROM and the like), magnetic recording medium (e.g. a hard disk and the like), magnetooptical recording medium (e.g. MO and the like), and a semiconductor memory, so as to be read by a hardware system such as an embedded system.

Alternatively, the design data may be held in the hardware system on a transmission channel, so as to be obtained by other hardware system via the transmission channel, such as a network and the like. Further, the design data obtained from the hardware system by other hardware system via the transmission channel may be downloaded to the programmable logic device via a download cable.

Alternatively, logically-synthesized, laid out, and wired design data may be stored in a serial ROM, so as to be transferred to the FPGA when the power is on. In addition, the design data stored in the serial ROM may be directly downloaded to the FPGA when the power is on.

INDUSTRIAL APPLICABILITY

The present invention can be applied as a processor or the like which can be used without modifying object codes optimized to an architecture before alteration, even in the case where the architecture is altered, such as a case where the number of the functional units is reduced along with area-saving or a case where single-cycle instructions are changed into multi-cycle instructions.

The invention claimed is:

1. A processor which decodes plural instructions and executes the decoded plural instructions in parallel, said processor comprising:
   an instruction buffer which holds a group of instructions executable in parallel;
   an instruction decoder that simultaneously decodes at least a portion of the group of instructions; and
   an instruction issuance controller that detects, based on a number of functional units, whether a factor obstructing simultaneous execution of the group of instructions exists in the group of instructions, and that supplies the group of instructions to said instruction decoder by controlling said instruction buffer so that a subset of the group of instructions are sequentially supplied when the factor obstructing simultaneous execution of the group of instructions exists and each of the group of instructions are simultaneously supplied when the factor obstructing simultaneous execution of the group of instructions does not exist, the functional units executing predetermined instructions included in the group of instructions,
   wherein said instruction issuance controller sequentially supplies, one-at-a-time, instructions from the group of instructions that correspond to respective values of a counter, when the subset of the group of instructions are sequentially supplied, the counter having, as a largest value, a largest number of instructions simultaneously decodable by said instruction decoder.

2. The processor according to claim 1,
   wherein said instruction issuance controller detects, as the factor obstructing simultaneous execution of the group of instructions, a combination of instructions that generates a structural hazard, the combination of instructions being included in the group of instructions, based on a result of decoding of the group of instructions, the result being inputted from said instruction decoder.

3. The processor according to claim 1,
   wherein said instruction issuance controller detects, as the factor obstructing simultaneous execution of the group of instructions, at least one of the group of instructions that generates a structural hazard, based on a result of decoding of the group of instructions, the result being inputted from said instruction decoder.

4. The processor according to claim 1,
   wherein said instruction issuance controller detects, as the factor obstructing simultaneous execution of the group of instructions, a predetermined number of multi-cycle instructions, the multi-cycle instructions being included in the group of instructions, based on a result of pre-decoding the group of instructions, the result being inputted from said instruction buffer.

5. The processor according to claim 1,
wherein said instruction issuance controller detects, as the factor obstructing simultaneous execution of the group of instructions, at least one multi-cycle instruction, the at least one multi-cycle instruction being included in the group of instructions, based on a result of pre-decoding the group of instructions, the result being inputted from said instruction buffer.

6. The processor according to claim 1,
wherein said instruction issuance controller sequentially supplies, one-at-a-time, instructions from the group of instructions that correspond to respective values of a second counter, when the subset of the group of instructions are sequentially supplied, the second counter having, as a largest value, a number of the instructions held by said instruction buffer.

7. The processor according to claim 2,
wherein said instruction issuance controller divides the group of instructions into sub-groups of instructions, each of the sub-groups having fewer than two instructions that generate the structural hazard, and that sequentially supplies the sub-groups of instructions corresponding to respective values of a second counter, when the subset of the group of instructions are sequentially supplied, the second counter having, as a largest value, a number of the instructions that generate the structural hazard.

8. The processor according to claim 3,
wherein said instruction issuance controller divides the group of instructions into sub-groups of instructions, each of the sub-groups having fewer than two instructions that generate the structural hazard, and that sequentially supplies the sub-groups of instructions corresponding to respective values of a second counter, when the subset of the group of instructions are sequentially supplied, the second counter having, as a largest value, a number of the instructions that generate the structural hazard.

9. The processor according to claim 4,
wherein said instruction issuance controller divides the group of instructions into sub-groups of instructions, each of the sub-groups having fewer than two of the multi-cycle instructions, and sequentially supplies the sub-groups of instructions corresponding to respective values of a second counter, when the subset of the group of instructions are sequentially supplied, the second counter having, as a largest value, a number of the multi-cycle instructions.

10. The processor according to claim 5,
wherein said instruction issuance controller divides the group of instructions into sub-groups of instructions, each of the sub-groups having fewer than two of the multi-cycle instructions, and sequentially supplies the sub-groups of instructions corresponding to respective values of a second counter, when the subset of the group of instructions are sequentially supplied, the second counter having, as a largest value, a number of the multi-cycle instructions.

11. A processor which decodes plural instructions and executes the decoded plural instructions in parallel, said processor comprising:
an instruction buffer which holds a group of instructions executable in parallel;
an instruction decoder that simultaneously decodes at least a portion of the group of instructions; and
an instruction issuance controller that detects, based on a number of functional units, whether a factor obstructing simultaneous execution of the group of instructions exists in the group of instructions, and that supplies the group of instructions to said instruction decoder by controlling said instruction buffer so that a subset of the group of instructions are sequentially supplied when the factor obstructing simultaneous execution of the group of instructions exists and each of the group of instructions are simultaneously supplied when the factor obstructing simultaneous execution of the group of instructions does not exist, the functional units executing predetermined instructions included in the group of instructions,
wherein said instruction issuance controller detects, as the factor obstructing simultaneous execution of the group of instructions, a combination of instructions that generates a structural hazard, the combination of instructions being included in the group of instructions, based on a result of decoding of the group of instructions, the result being inputted from said instruction decoder, and
wherein said instruction issuance controller divides the group of instructions into sub-groups of instructions, each of the sub-groups having fewer than two instructions that generate the structural hazard, and that sequentially supplies the sub-groups of instructions corresponding to respective values of a counter, when the subset of the group of instructions are sequentially supplied, the counter having, as a largest value, a number of the instructions that generate the structural hazard.

12. A processor which decodes plural instructions and executes the decoded plural instructions in parallel, said processor comprising:
an instruction buffer which holds a group of instructions executable in parallel;
an instruction decoder that simultaneously decodes at least a portion of the group of instructions; and
an instruction issuance controller that detects, based on a number of functional units, whether a factor obstructing simultaneous execution of the group of instructions exists in the group of instructions, and that supplies the group of instructions to said instruction decoder by controlling said instruction buffer so that a subset of the group of instructions are sequentially supplied when the factor obstructing simultaneous execution of the group of instructions exists and each of the group of instructions are simultaneously supplied when the factor obstructing simultaneous execution of the group of instructions does not exist, the functional units executing predetermined instructions included in the group of instructions,
wherein said instruction issuance controller divides the group of instructions into sub-groups of instructions, each of the sub-groups having fewer than two instructions that generate a structural hazard, and that sequentially supplies the sub-groups of instructions corresponding to respective values of a counter, when the subset of the group of instructions are sequentially supplied, the counter having, as a largest value, a number of the instructions that generate the structural hazard.

13. The processor according to claim 12,
wherein said instruction issuance controller detects, as the factor obstructing simultaneous execution of the group of instructions, at least one of the group of instructions that generates the structural hazard, based on a result of decoding of the group of instructions, the result being inputted from said instruction decoder.

* * * * *